United States Patent
Laroia et al.

(10) Patent No.: US 9,049,722 B2
(45) Date of Patent: *Jun. 2, 2015

(54) METHODS AND APPARATUS OF ENHANCING PERFORMANCE IN WIRELESS COMMUNICATION SYSTEMS

(75) Inventors: Rajiv Laroia, Basking Ridge, NJ (US); Murari Srinivasan, Palo Alto, CA (US); Junyi Li, Bedminster, NJ (US)

(73) Assignee: QUALCOMM Incorporated, San Diego, CA (US)

(*) Notice: Subject to any disclaimer, the term of this patent is extended or adjusted under 35 U.S.C. 154(b) by 703 days.

This patent is subject to a terminal disclaimer.

(21) Appl. No.: 11/599,837

(22) Filed: Nov. 15, 2006

(65) Prior Publication Data

US 2007/0064641 A1 Mar. 22, 2007

Related U.S. Application Data

(63) Continuation of application No. 10/830,976, filed on Apr. 23, 2003, now Pat. No. 7,142,864.

(60) Provisional application No. 60/464,823, filed on Apr. 23, 2003.

(51) Int. Cl.
*H04W 36/00* (2009.01)
*H04W 72/04* (2009.01)
(Continued)

(52) U.S. Cl.
CPC .......... *H04W 72/048* (2013.01); *H04B 7/0452* (2013.01); *H04B 7/0617* (2013.01); *H04B 7/0689* (2013.01); *H04B 7/0695* (2013.01); *H04W 52/346* (2013.01); *H04B 17/24* (2015.01)

(58) Field of Classification Search
USPC ........ 455/450, 422.1, 452.1, 452.2, 454, 464, 455/441, 434, 418, 552.1, 414.1, 435.3, 455/419, 440, 458, 404.2; 370/320, 338, 370/328, 329, 341, 431, 253, 252
See application file for complete search history.

(56) References Cited

U.S. PATENT DOCUMENTS 5,914,942 A * 6/1999 Hassan et al. ................. 370/316
6,119,013 A 9/2000 Maloney et al.
(Continued)

FOREIGN PATENT DOCUMENTS

CN 1234152 11/1999
CN 1272295 11/2000
(Continued)

OTHER PUBLICATIONS

A.F. Naguib, V. Tarokh, N. Seshardi, A.R. Calderbank, "A Space-Time Modem for High-Data-Rate Wireless Communications", IEEE Journal on Selected Areas in Communications, vol. 16, No. 8, Oct. 1998, pp. 1459-1478.
(Continued)

*Primary Examiner* — Khai M Nguyen
(74) *Attorney, Agent, or Firm* — James K. O'Hare

(57) ABSTRACT

Methods and apparatus for supporting and using multiple communications channels corresponding to different transmit technologies and/or access technologies in parallel within a cell of a wireless communications system are described. Mobile nodes support multiple technologies and can switch between the technology being used at a particular point in time, e.g., from a first channel corresponding to a first technology to a second channel corresponding to a different technology which provides better transmission characteristics, e.g., a better perceived channel quality. Mobiles maintain at least two sets of channel quality information at any one point in time. Mobiles select the better channel and communicate the channel selection to the base station or communicate channel quality information for multiple channels to the base station and allow the base station to select the channel corresponding to the technology providing the better conditions for the mobile. Different mobiles in the same cell may support different technologies.

29 Claims, 20 Drawing Sheets

(51) Int. Cl.
*H04B 7/06* (2006.01)
*H04W 52/34* (2009.01)
*H04B 7/04* (2006.01)

(56) References Cited

U.S. PATENT DOCUMENTS

| | | | |
|---|---|---|---|
| 6,154,647 | A | 11/2000 | Dahlin et al. |
| 6,226,520 | B1 | 5/2001 | Jeoung |
| 6,473,418 | B1 | 10/2002 | Laroia et al. |
| 6,512,935 | B1* | 1/2003 | Redi ............................. 455/574 |
| 6,516,192 | B1 | 2/2003 | Spaur et al. |
| 6,594,241 | B1 | 7/2003 | Malmlof |
| 6,640,115 | B1* | 10/2003 | Fujimoto et al. ............. 455/567 |
| 6,650,655 | B2* | 11/2003 | Alvesalo et al. ............. 370/468 |
| 6,694,147 | B1 | 2/2004 | Viswanath et al. |
| 6,700,882 | B1* | 3/2004 | Lindoff et al. ................ 370/337 |
| 6,804,521 | B2 | 10/2004 | Tong et al. |
| 6,816,478 | B1 | 11/2004 | Laroia et al. |
| 6,819,930 | B1 | 11/2004 | Laroia et al. |
| 6,889,050 | B1 | 5/2005 | Willars et al. |
| 6,895,255 | B1 | 5/2005 | Bridgelall et al. |
| 6,898,441 | B1 | 5/2005 | Kogiantis et al. |
| 6,944,460 | B2 | 9/2005 | Haartsen |
| 6,947,750 | B2 | 9/2005 | Kakani et al. |
| 6,987,985 | B2* | 1/2006 | Purkayastha et al. ...... 455/552.1 |
| 6,999,439 | B2 | 2/2006 | Takano |
| 7,091,854 | B1* | 8/2006 | Miao ........................ 340/539.26 |
| 7,092,737 | B2 | 8/2006 | Horng et al. |
| 7,103,021 | B2 | 9/2006 | Jou |
| 7,142,864 | B2 | 11/2006 | Laroia et al. |
| 7,936,831 | B2 | 5/2011 | Laroia et al. |
| 2002/0022453 | A1 | 2/2002 | Balog et al. |
| 2002/0068608 | A1 | 6/2002 | Souissi |
| 2002/0087674 | A1 | 7/2002 | Guilford et al. |
| 2002/0101943 | A1* | 8/2002 | Proctor, Jr. .................... 375/346 |
| 2002/0102987 | A1 | 8/2002 | Souisse et al. |
| 2003/0027568 | A1 | 2/2003 | Berger |
| 2003/0064729 | A1* | 4/2003 | Yamashita .................... 455/451 |
| 2003/0086371 | A1 | 5/2003 | Walton et al. |
| 2003/0153273 | A1 | 8/2003 | Ebert et al. |
| 2003/0153350 | A1* | 8/2003 | Matsumoto ................... 455/550 |
| 2003/0189917 | A1 | 10/2003 | Sudo |
| 2003/0190897 | A1* | 10/2003 | Lei et al. ....................... 455/101 |
| 2004/0190484 | A1 | 9/2004 | Shin et al. |
| 2004/0204918 | A1 | 10/2004 | Dacosta |
| 2005/0111599 | A1* | 5/2005 | Walton et al. ................ 375/347 |
| 2005/0164633 | A1* | 7/2005 | Linjama et al. .............. 455/41.2 |
| 2005/0169211 | A1 | 8/2005 | Malladi et al. |
| 2005/0181799 | A1* | 8/2005 | Laroia et al. .................. 455/450 |
| 2007/0019583 | A1* | 1/2007 | Laroia et al. .................. 370/329 |
| 2007/0248015 | A1 | 10/2007 | Yano et al. |
| 2010/0099405 | A1* | 4/2010 | Brisebois et al. ............. 455/434 |
| 2010/0113073 | A1* | 5/2010 | Schlesener et al. ........... 455/466 |
| 2013/0183992 | A1 | 7/2013 | Laroia et al. |

FOREIGN PATENT DOCUMENTS

| | | |
|---|---|---|
| CN | 1435960 A | 8/2003 |
| EP | 1187506 A1 | 3/2002 |
| EP | 1524790 A1 | 4/2005 |
| JP | 06069859 | 3/1994 |
| JP | 09139980 | 5/1997 |
| JP | 10243448 A | 9/1998 |
| JP | 2000183793 | 6/2000 |
| JP | 2001119744 | 4/2001 |
| JP | 2001515301 | 9/2001 |
| JP | 2002135204 A | 5/2002 |
| JP | 2002218525 A | 8/2002 |
| JP | 2002218526 | 8/2002 |
| JP | 2002252866 A | 9/2002 |
| JP | 2003032736 A | 1/2003 |
| JP | 2003070055 | 3/2003 |
| JP | 2004282542 | 10/2004 |
| JP | 2006069859 A | 3/2006 |
| KR | 100331883 | 3/2002 |
| KR | 100823904 | 4/2008 |
| KR | 100971349 | 7/2010 |
| WO | WO9818213 A2 | 4/1998 |
| WO | WO0223743 | 3/2002 |
| WO | WO2005048563 | 5/2005 |

OTHER PUBLICATIONS

S. Alamouti, : A Simple Transmit Diversity Technique fro Wireless Communications, IEEE Journal on Selected Areas in Communications, vol. 16, No. 8, Oct. 1998, pp. 1451-1458.

PCT International Search Report and Written Opinion dated Dec. 1, 2004 for International Application No. PCT/US2004/012539, which was filed on Apr. 23, 2004.

International Preliminary Report on Patentability, PCT/US04/012539, IB Geneva Switzerland, Oct. 28, 2005.

Naguib, A.F. "Increasing data rate over wireless channels" IEEE Signal Processing Magazine. vol. 17, Issue 3, pp. 76-92, May 2000.

Tarokh et al., "Space-Time Codes for High Data Rate Wireless Communication: Performance Criterion and Code Construction," IEEE Transactions on Information Theory, vol. 44, No. 2, pp. 744-765, Mar. 1998.

Suppplernentary European Search Report—EP04750524—Search Authority—The Hauge—Sep. 12, 2011.

Motorola: "HSDPA signaling requirements" TSGRAN Working Group 2, Jan. 15-19, 2001 (Jan. 15, 2001), XP002290533, 2 pages.

Nokia: "HSDPA related signalingyarameters in downlink—Tdoc 12A010005" TSG-RAN WG1/WG2 ADHOC ON HSDPA, 5 1—Apr. 6, 2001 (Apr. 5, 2001), XP002290532, 5 pages.

Samsung Electronics: "R1-01-0874" TSGRAN WG1 Meeting #21, Aug. 27-31, 2001 (Aug. 27, 2001), XP002291724, 10 pages.

* cited by examiner

METHODS AND APPARATUS OF ENHANCING PERFORMANCE IN WIRELESS COMMUNICATION SYSTEMS

RELATED APPLICATION

The present application is a continuation of U.S patent application Ser. No. 10/830,976, filed on Apr. 23, 2004 titled "METHODS AND APPARATUS OF ENHANCING PERFORMANCE IN WIRELESS COMMUNICATION SYSTEMS" which issued as U.S. Pat. No. 7,142,864 and which claims the benefit of U.S. Provisional Application Ser. No. 60/464,823 filed on Apr. 23, 2003.

FIELD OF THE INVENTION

The present invention relates to wireless communications methods and apparatus and, more particularly, to methods and apparatus for using multiple communications techniques on a dynamically selected basis to communicate with one or more devices.

BACKGROUND

In a wireless multiple access communication system, a base station is responsible for communicating with multiple users. In general, the condition and characteristics of the wireless communication channel between a user and the base station can vary quite a lot from one user to another. The reason is that while channel fading is an ubiquitous phenomenon occurring in most wireless channels, the nature of the fading process can vary widely. For example, users who are moving rapidly experience fast fading, which can be challenging for the transmitter to track. On the other hand, stationary or pedestrian users normally experience channels with very slow fading that can be tracked accurately by the transmitter using feedback from the receiver. As the transmission techniques for achieving optimum performance depend on the condition and characteristics of channels on which communication takes place, it may be infeasible to have a single technique that performs well for all channel scenarios.

Several advanced communication techniques have been proposed for state-of-the-art wireless communication systems, many of which use multiple antennas at the transmitter and sometimes at the receiver. Some communication techniques are optimized for situations where the transmitter has multiple antennas while the receiver is constrained to have a single antenna. Within this category, some techniques, such as the Alamouti scheme, are optimized for receivers that perceive rapidly fading channels that can be tracked at the receiver but not at the transmitter. The Alamouti scheme is described in S. M. Alamouti, "A simple transmitter diversity scheme for wireless communications," IEEE Journal on Selected Areas in Communication, vol. 16, pp. 1451-1458, October 1998. There is a whole family of techniques, generally referred to as MIMO (multiple-input, multiple-output) techniques that are applicable in situations where the transmitter as well as the receiver have multiple antennas and can form a matrix channel. Some of these techniques are described in 1) V. Tarokh, N. Seshadri and R. Calderbank, "Space-time codes for high data rate wireless communication: Performance criterion and code construction," IEEE transactions on Information Theory, vol. 44, pp. 744-765, March 1998 and 2) A. Naguib, N. Seshadri and R. Calderbank, "Increasing data rate over wireless channels," IEEE Signal Processing Magazine, May 2000. These can, in general, extend performance along two dimensions. They can either be used for providing additional diversity (diversity gain), or they can be used to increase the data rate by establishing parallel data streams between transmit and receive antennas (spatial multiplexing). In general, a given space-time coding technique offers some diversity gain and some spatial multiplexing gain.

While different transmission technologies may provide benefits to one set of users in a multi-user system, other technologies may be better suited for providing signals to another set of users in the system. Furthermore, which technology provides the best method for supplying information to a user may change over time, e.g., as the user moves from one location to another and/or a users rate of movement changes with time. Accordingly, there is a need for methods and apparatus for providing a mobile user the benefits of a particular technology at a point in time which best suits the mobile's needs, reception characteristics and/or other mobile related characteristics such as motion characteristics, at the particular point in time. In addition, in a multi-user system, in would be desirable to be able to provide different wireless terminals, e.g., mobile devices, in a cell

SUMMARY OF THE INVENTION

Given the mix of users in a wireless communication system, it may not be desirable to use a transmission technique that is optimized for a single particular category of users. This use of one transmission technique for all classes of users may constrain the performance of the system.

The present invention is directed to methods and apparatus for taking advantage of the transmission benefits which can be achieved by supporting a plurality of different communications technologies at a base station or other common node which interacts using wireless communications channels with one or more wireless terminals, e.g., mobile nodes. The different communications technologies may be different transmission technologies which involve, e.g., different ways of controlling antenna patterns and/or different access technologies. Access technologies are frequently defined in engineering or other fixed standards which are, in many cases, publicly available.

In accordance with the present invention a base station supports multiple communications channels which are sometimes referred to herein as pipes. The quality of the communication channel, and thus its capacity to communicate information, is normally a function of both the amount of resources allocated to the particular channel and the type of technology used to implement the channel. Physical conditions such as signal interference may also affect wireless transmission and thus the quality of a channel. However, the effect of physical conditions on a channel will often differ depending on the type of access technology used to implement the particular communications channel.

In accordance with one embodiment of the present invention, a base station supports multiple channels corresponding to different technologies at any particular point in time. The channels may be fixed and remain unchanged over long periods of time, e.g., multiple periods in which one or more mobile nodes are scheduled to use the communications channel. Alternatively, some or all of the channels may be periodic in nature with channels corresponding to different technologies being maintained at different points in time, e.g., in a repeating predictable manner resulting in different channel combinations existing at various points in time. In addition and/or as an alternative to using a fixed set of communications channels corresponding to different accesses technologies in parallel, a base station may operate to allocate resources to channels corresponding to channels corresponding to different technologies in a dynamic fashion. For example, in some embodiments, in response to a mobile node indicating a selection of a channel corresponding to a particular technology to be used to the base station or the base station selecting to support communications with the mobile node using a particular communications technology, the base station may create a channel corresponding to the selected communications technology and/or increase the allocation of resources to an existing channel corresponding to the elected communications technology, e.g., to increase the amount of time the selected technology is used and to thereby increase the number of channel segments corresponding to a particular transmission technology.

The communications technologies which are used to create communications channels may, and often are, incompatible. For example communication over communications channel created with different incompatible technologies may require physical and/or signal processing changes in the receiver and/or transmitter when changing from a communications channel corresponding to a first technology to a communications channel implemented using a second technology which is incompatible with the first technology. This is because particular technologies may impose physical and/or other constraints such as specific hardware configuration requirements, such as the number of antennas used, which have to be satisfied for successful receipt and/or transmission of signals corresponding to the particular technology. Communications technologies are often defined by communications standards published by one or more standards bodies. Two communications technologies defined by communications standards may be considered incompatible when compliance with the communications standard which defines or specifies the requirements for one communications technology would result in a transmission, reception or other constraint or operation which would violate a requirement specified in the standard which defines or otherwise specifies the requirements for the other of the two communications technologies.

A system implemented in accordance with the invention normally includes at least one communications cell but will more commonly include multiple cells. Each cell includes at least one base station. A plurality of wireless terminals, e.g., mobile devices, normally communicate with the base station at any given point in time, e.g., using segments of one or more communications channels. Given that different communications channels use different communications channels, to take advantage of the benefits of the diversity provided by supporting multiple communications technologies at the same time or in a periodic predictable manner which uses different technologies at recurring time intervals, at least some wireless terminals support multiple technologies. For example, a wireless terminal may be capable of supporting OFDM and CDMA communications. While some wireless terminals support multiple technologies, other wireless terminals may support only one technology. For example, some wireless terminals may include a single receive antenna while other wireless terminals may include multiple receive antennas. The wireless terminals which include multiple receive antennas may can switch between communications channels which use MIMO and require multiple receive antennas and channels which correspond to technologies which use a single receive antenna. Wireless terminals with a single receive antenna would use the channel or channels which are implemented using the single receive antenna technologies and would still be able to interact with the base station but would not be able to take advantage of the channels require multiple receive antennas.

In order to support an intelligent selection of which channel to use at a particular time, each wireless terminal which supports multiple technologies maintains a set of quality information, e.g. SNR information, for at least two channels implemented using two different, e.g., incompatible, technologies. In some implementations, the wireless terminal selects between the plurality of channels based on which channel is indicated to provide the better quality at a particular point in time as indicated, e.g., by a comparison of the quality information corresponding to the different channels. In one such embodiment the wireless terminal transmits a signal to the base station indicating the technology and/or channel corresponding to a particular technology which the wireless terminal has determined will provide the desired quality level. In other embodiments, the wireless terminal transmits a signal to the base station providing quality information on at least two channels implemented using different technologies. The base station then selects the channel which is implemented using a technology which will provide the wireless terminal a desired level of performance. The base station selection channel selection method is particularly beneficial where multiple channels may provide a suitable quality level to the wireless terminal and the base station considers channel loading in addition to the reported channel quality information when making a channel selection with regard to the channel to be used to communicate with a particular wireless terminal.

In some embodiments, the mobility of the mobile node is taken into consideration when deciding what technology to use to communicate with the mobile node. In cases where the mobile node is moving at a high speed, the channel is likely to be changing at a relatively high rate. The speed of motion by a wireless terminal is sometimes estimated based on the rate of fading, a measured Doppler shift, or other signals such as the rate of changes in the power level of a periodic signal received form a wireless terminal or the rate and/or amount of timing corrections made by a wireless terminal or signaled to the wireless terminal.

When a channel changes at a high rate, the rate at which a wireless terminal feeds back channel condition information to a base station should also be high, e.g., so that the information is not highly inaccurate by the time it is received and/or acted upon. In a wireless system, where conservation of communications bandwidth is often an important consideration, in the case of rapid movement of a wireless terminal, it may be desirable to use a communications technology which uses little or no channel condition feedback, e.g., to adjust the antenna transmission pattern.

In cases where wireless terminal motion is zero or relatively slow, beam forming techniques which use feedback information from the wireless terminals at the base station to control antenna patterns may be highly desirable.

Accordingly, in some embodiments of the invention the wireless terminals estimate their rate of motion or the base station makes a motion determination using one or more of the above described techniques or various other techniques such as using Global Positioning Satellite (GPS) information to detect changes in position. The rate of motion is then used in some embodiments to detect the communications channel which is implemented using the communications technology which is best suited for the particular measured or estimated rate of motion. In some cases, this involves selecting a channel which uses a technology which requires little or no channel condition feedback information for a wireless terminal moving at a fast rate and selecting a communications channel which uses a faster channel condition feedback rate when the wireless terminal is moving at a slower rate. Different motion rate thresholds may be used in a wireless terminal to select between communications channels corresponding to different communications technologies so that the technology used can be best matched to the wireless terminals rate of motion which, in the case of a station terminal will be zero.

In addition to physical issues, the type of data to be transmitted and the amount of data may affect the selection of a channel corresponding to a particular technology. For example, some technologies may be better suited to voice traffic which may require a continuous or near continuous connection and/or flow of data for extended period of time while other technologies may be better suited to short bursty data transmissions where minimal set up time may be beneficial.

In view of the above discussion, it should be appreciated that wireless terminals capable of supporting multiple different communications technologies can obtain benefits by switching between channels implemented using various different, and often incompatible, communications technologies. This allows a wireless terminal to obtain the benefit of using the best or at least a suitable supported technology for a particular given situation. Examples of different access technologies which may be supported by a wireless terminal in accordance with the invention include CDMA, OFDM, and narrowband signal carrier technologies. Access technologies defined in various WiFi standards and/or other communications standards may also be supported.

Numerous additional benefits, embodiments and features of the present invention are described in the detailed description which follows.

DETAILED DESCRIPTION

This invention discloses methods and apparatus to enhance the overall performance of a wireless multiuser communication system using multiple transmit antennas. The methods and apparatus of the present invention may be used in systems such as the ones described in U.S. patent Ser. No. 09/691,766, filed Oct. 18, 2000 which is hereby expressly incorporated be reference. Communications systems in which the invention may be used often typically feature communication to and from multiple wireless users whose channel conditions and characteristics can vary significantly from one user to another. The remainder of this description, for purposes of explaining the invention, will be presented in the context of an exemplary cellular wireless system. However, the invention is sufficiently fundamental that its advantages may be realized in other flavors of wireless communication systems, e.g., non-cellular systems, as well.

This invention realizes significant benefits in the downlink (from the base station to mobile users) as well as the uplink (mobile users transmitting to the base station) channels of cellular wireless systems. The description below focuses on the downlink but it should be understood that the technique is general in nature and is applicable to the uplink as well in systems where a mobile, e.g., wireless terminal, has multiple transmit antennas.

The central idea of this invention is the creation of multiple parallel 'pipes' by the subdivision of the available transmission resources in a system, and the realization of different transmission techniques using multiple transmit antennas in these pipes.

In accordance with this invention, a "pipe" is most generally a partition of the available air link resource. The available degrees of freedom are partitioned into several pipes such that the receiver can measure the wireless channel quality on any of the parallel pipes independently. The partition can be done in any particular way, such as in frequency, in time, or in code, or some combination of these.

Figure 1:
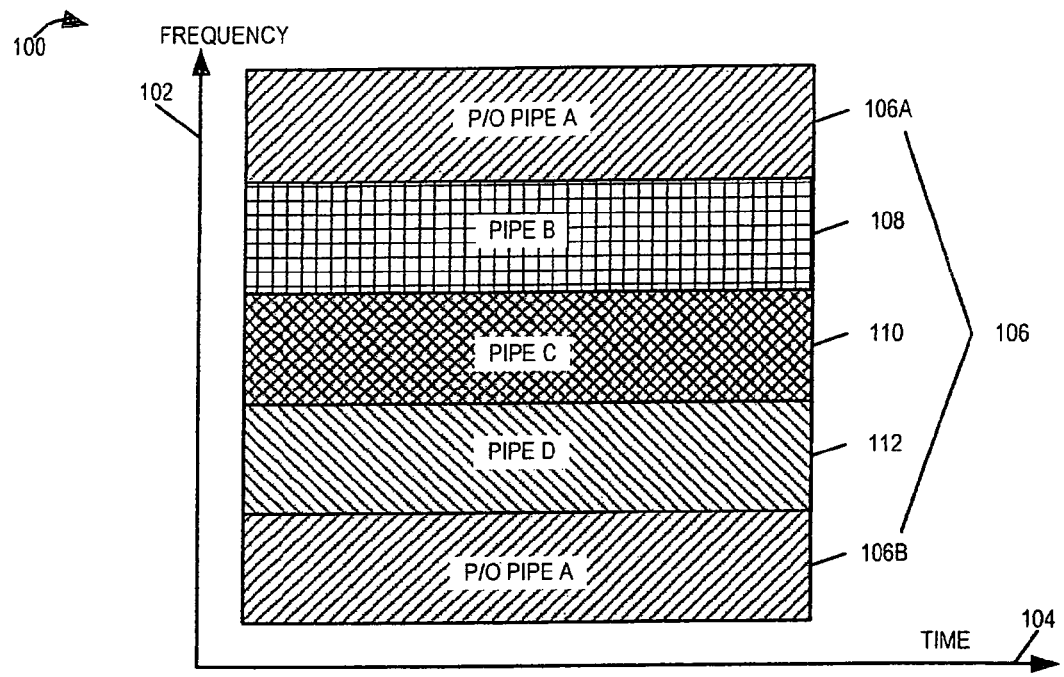
FIGS. 1-3 illustrate various communications channels which may be used to communicate between a wireless terminal and a base station in accordance with the invention.
Figure 2:
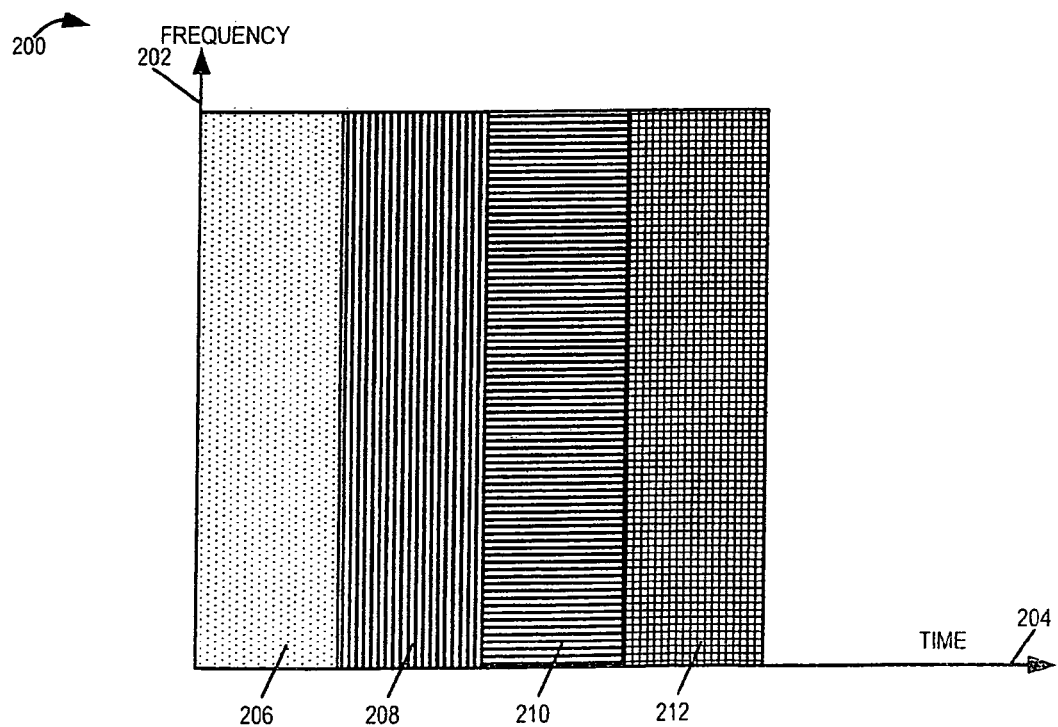

In general, the construction of the pipes can be in a frequency or time division manner or in a combined time/frequency manner. The embodiment in FIG. 1 constructs the parallel pipes by partitioning the air link resource in frequency. FIG. 1 is a graph 100 of frequency on vertical axis 102 vs time on horizontal axis 104. FIG. 1 includes four downlink parallel pipes A 106, B 108, C 110 and D 112. Pipe A 106, includes two disjoint frequency segments 106A, 106B and may represent a pipe for high mobility uses. Pipe B 108, pipe C 110, and pipe D 112 each include a single frequency segment and may represent pipes for low mobility users. FIG. 2 shows another embodiment where parallel pipes are obtained by partitioning the air link resource in time. FIG. 2 is a graph 200 of frequency on the vertical axis 202 vs time on the horizontal axis 204. FIG. 2 includes four segments 206, 208, 210, and 212, where each segment 206, 208, 210, 212 occupies the same frequency range, but a different time slot.

Figure 3:
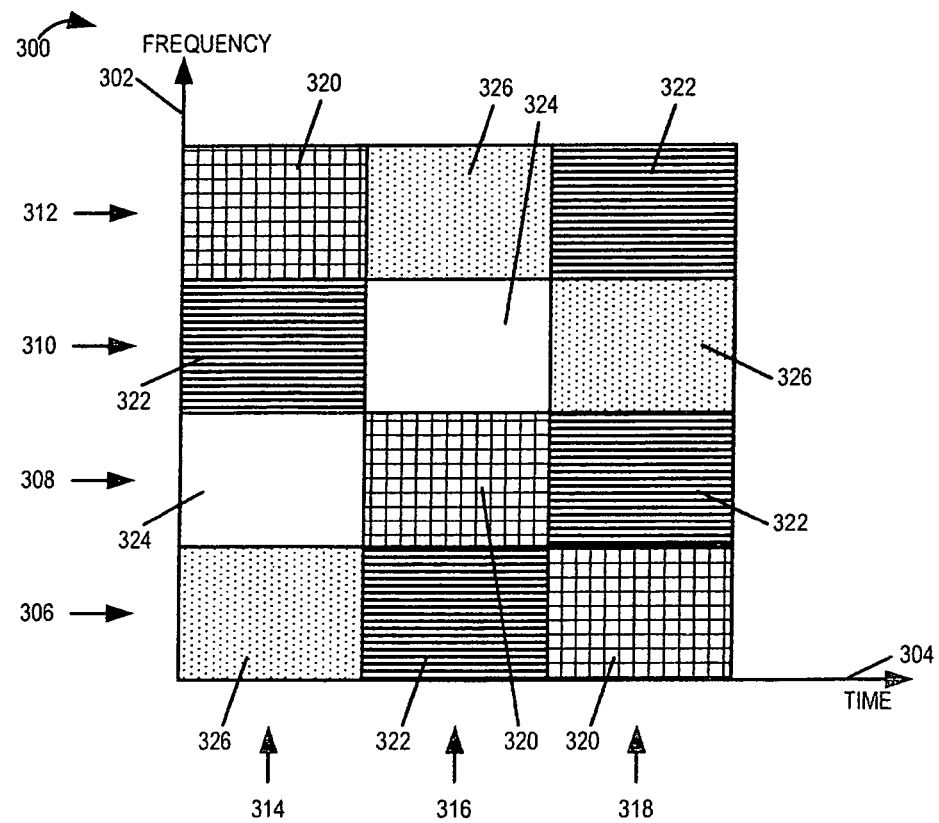
Figure 6:
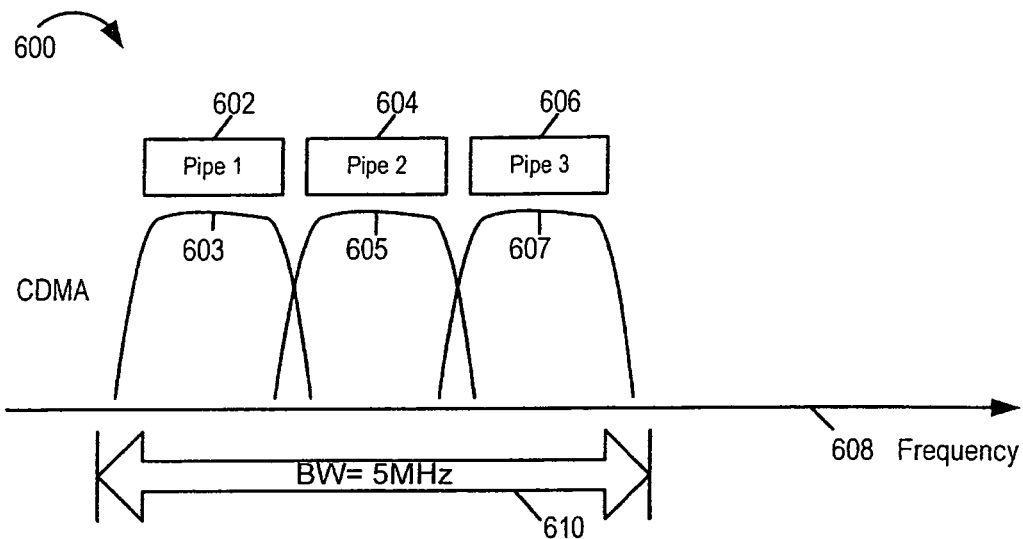
FIG. 6 illustrates exemplary embodiments of using parallel pipes in CDMA and OFDM systems.
Figure 6:
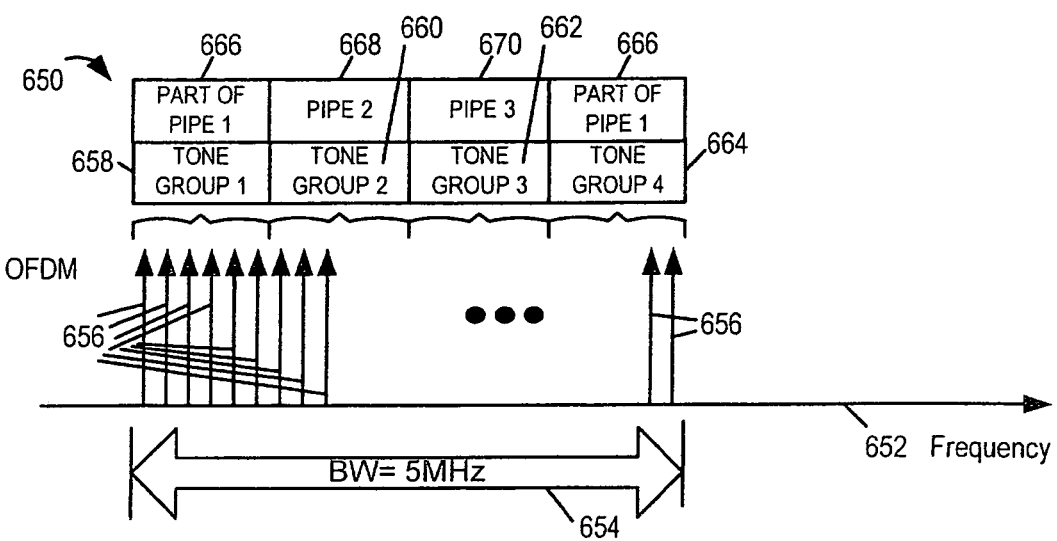

The two embodiments shown in FIG. 1 and FIG. 2 can be mixed to lead to another embodiment as shown in FIG. 3, where both frequency division and time division to construct parallel pipes. FIG. 3 is a graph 300 of frequency on the vertical axis 302 vs time on the horizontal axis 304. FIG. 3 illustrates four physical frequency bands, a first physical frequency band 306, a second physical frequency band 308, a third physical frequency band 310, and a fourth physical frequency band 312. FIG. 3 also illustrates three time slots, a first time slot 314, a second time slot 316, and a third time slot 318. In FIG. 3, each pipe 320, 322, 324, 326 while defined in a particular logical frequency extent occupies a different physical frequency band from one time slot to the next. Different types of shading are used to distinguish between different pipes in FIG. 3 with different frequency time blocks with the same shading corresponding to the same pipe. Pipe 320 occupies: frequency band 312 in first time slot 314, frequency band 308 in second time slot 316, and frequency band 306 in third time slot 318. Pipe 322 occupies: frequency band 310 in first time slot 314, frequency band 306 in second time slot 316, and frequency bands 312 and 308 in third time slot 318. Pipe 324 occupies: frequency band 308 in first time slot 314 and frequency band 310 in second time slot 316. Pipe 326 occupies: frequency band 306 in first time slot 314, frequency band 312 in second time slot 316, and frequency band 310 in third time slot 318. FIG. 6 illustrates exemplary embodiments of using parallel pipes in CDMA and OFDM systems. FIG. 6 is a drawing 600 illustrating three pipes, pipe 1 602, pipe 2 604, and pipe 3 606 in an exemplary CDMA system. Drawing 600 includes a horizontal axis 608 representing frequency. The exemplary CDMA system has a 5 MHz bandwidth 610 in total, which is partitioned into three carriers 603, 605, 607, each representing a 1.25 MHz pipe, resulting in a total of 3 pipes (Pipe 1 602, pipe 2 604, pipe 3 606). Thus, there are three parallel pipes 602, 604, 606 in that 5 MHz CDMA system. FIG. 6 also includes a drawing 650 illustrating multiple pipes in an exemplary OFDM system. Drawing 650 includes a horizontal axis 652 representing frequency. The illustrated OFDM system also has a 5 MHz bandwidth 654 in total, which is divided into N tones where vertical arrows 656 are used to represent individual tones. In FIG. 6, those N tones 656 are grouped into four subsets 658, 660, 662, 664. FIG. 650 includes three parallel pipes 666, 668, 670. First parallel pipe 666 includes two tone subsets 658 and 664. Second parallel pipe 668 include one tone subset 660. Third parallel pipe 670 includes one tone subset 662. Thus, there are three parallel pipes in that 5 MHz OFDM system.

Figure 7:
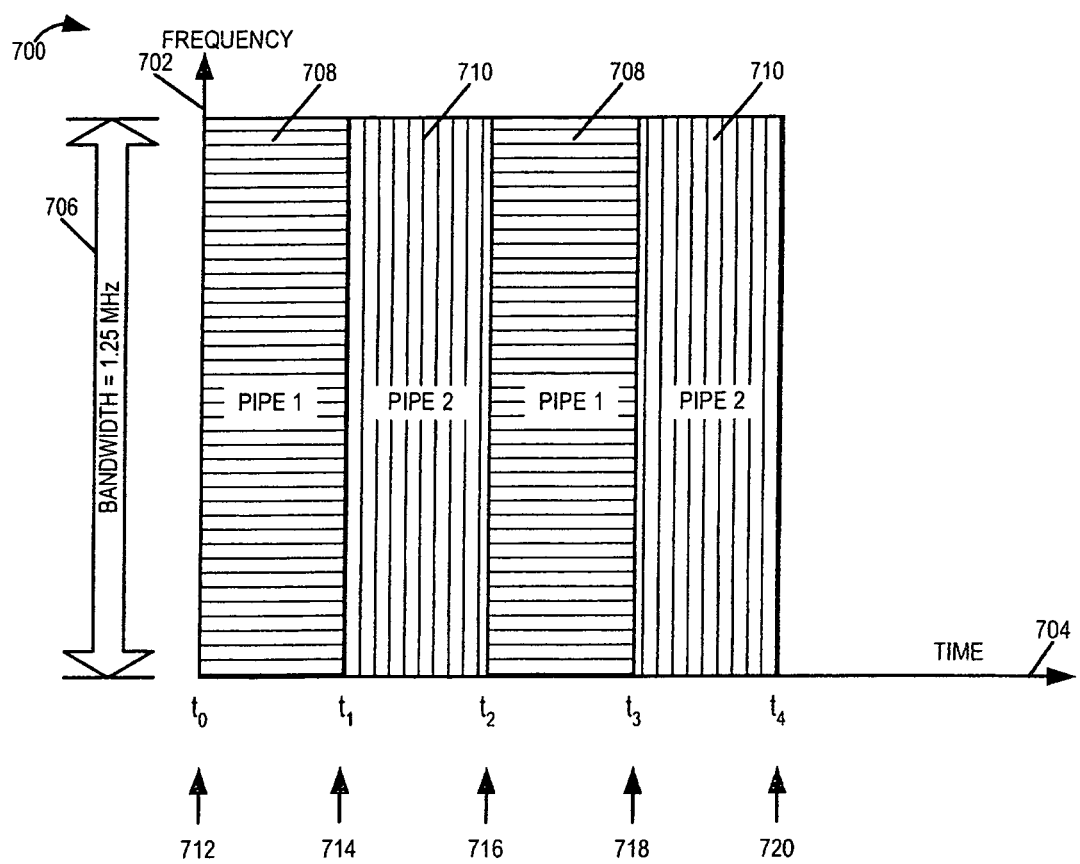
FIG. 7 is a graph illustrating parallel pipes that may be used in an exemplary CDMA or OFDM system implemented in accordance with the invention.

FIG. 7 is a graph 700 of frequency on the vertical axis 702 vs time on the horizontal axis 704 illustrating parallel pipes that may be used in an exemplary CDMA or OFDM system. In FIG. 7 the illustrated CDMA or OFDM system has a 1.25 MHz bandwidth 706 in total, which is shared by two parallel pipes 708, 710 in a time division manner. Different shading is used to indicate the components of the different pipes 708, 710 with horizontal lines being used to indicate components of one pipe and vertical lines to indicate components of the other pipe. Pipe 1 708 occupies the 1.25 MHz BW from time $t_0$ 712 to $t_1$ 714 and from time $t_2$ 716 to $t_3$ 718. Pipe 2 710 occupies the 1.25 MHz BW from time $t_1$ 714 to $t_2$ 716 and from time $t_3$ 718 to $t_4$ 720.

Each of the pipes formed in this manner is associated with a specific use of the multiple transmit antennas available at the transmitter. In general, the different pipes use the available antennas differently. The transmission technique within a pipe may be optimized for a certain category of wireless channel characteristics and, in general, suits a certain category of users. A desirable characteristic of this partitioning is that wireless receivers should be able to monitor channel conditions corresponding to each pipe independently. One way this may be achieved, for example, is to transmit pilots independently in each of the pipes to facilitate channel estimation.

An exemplary embodiment of the invention is described below in the context of a cellular wireless data communication system. The exemplary system is similar to the systems disclosed in U.S. patent applications 09/706,377 and 09/706,132, which are hereby incorporated by reference. The exemplary system includes modifications to the systems described in the referenced applications which cause the exemplary system to implement the present invention. While an exemplary wireless system is used for purposes of explaining the invention, the invention is broader in scope than the example and can be applied, in general, to many other communication systems as well.

In a wireless data communication system, the air link resource generally includes bandwidth, time or power. The air link resource that transports data and/or voice traffic is called the traffic channel. Data is communicated over the traffic channel in traffic channel segments (traffic segments for short). Traffic segments may serve as the basic or minimum units of the available traffic channel resources. Downlink traffic segments transport data traffic from the base station to the wireless terminals, while uplink traffic segments transport data traffic from the wireless terminals to the base station. One system to which the present invention may be applied is the spread spectrum OFDM (orthogonal frequency division multiplexing) multiple-access system disclosed in U.S. patent application Ser. No. 09/267,471.

In the exemplary system used here to explain the invention, a traffic segment includes of a number of frequency tones over a finite time interval. Each of the parallel pipes includes traffic segments that can be shared dynamically among the wireless terminals that are communicating with a base station. A scheduling function is a module in the base station that assigns each uplink and downlink traffic segment to one (or more) of the mobile terminals based on a number of criteria. A given traffic segment can be entirely contained in one pipe or more generally it can occupy resources in more than one pipe or even each of the pipes. The transmitter and receiver know the structure of traffic segments in the pipes.

Figure 8:
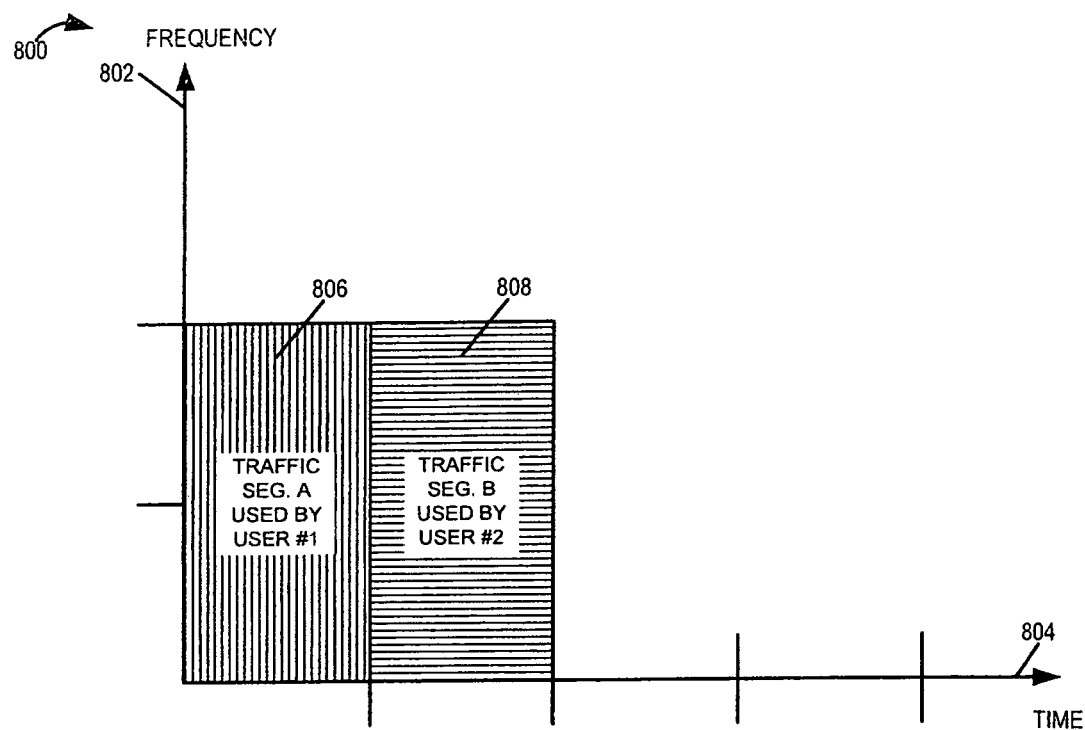
FIG. 8 illustrates dynamically shared traffic segments.

The allocation of traffic segments to users is done on a segment-by-segment basis and different segments can be allocated to different users. FIG. 8 is a drawing 800 illustrating dynamically shared traffic segments. FIG. 8 includes a vertical axis 802 representing frequency vs a horizontal axis 804 representing time, and is used for plotting exemplary traffic segments. For example, in FIG. 8, segment A 806, having vertical lines for shading, is assigned to user #1 by the base station scheduler and segment B 808, having horizontal lines for shading, is assigned to user #2. The base station scheduler can rapidly assign the traffic channel segments to different users according to their traffic needs and channel conditions. The allocation of channel segments may be time varying in general. The traffic channel is thus effectively shared and dynamically allocated among different users on a segment-by-segment basis.

Figure 9:
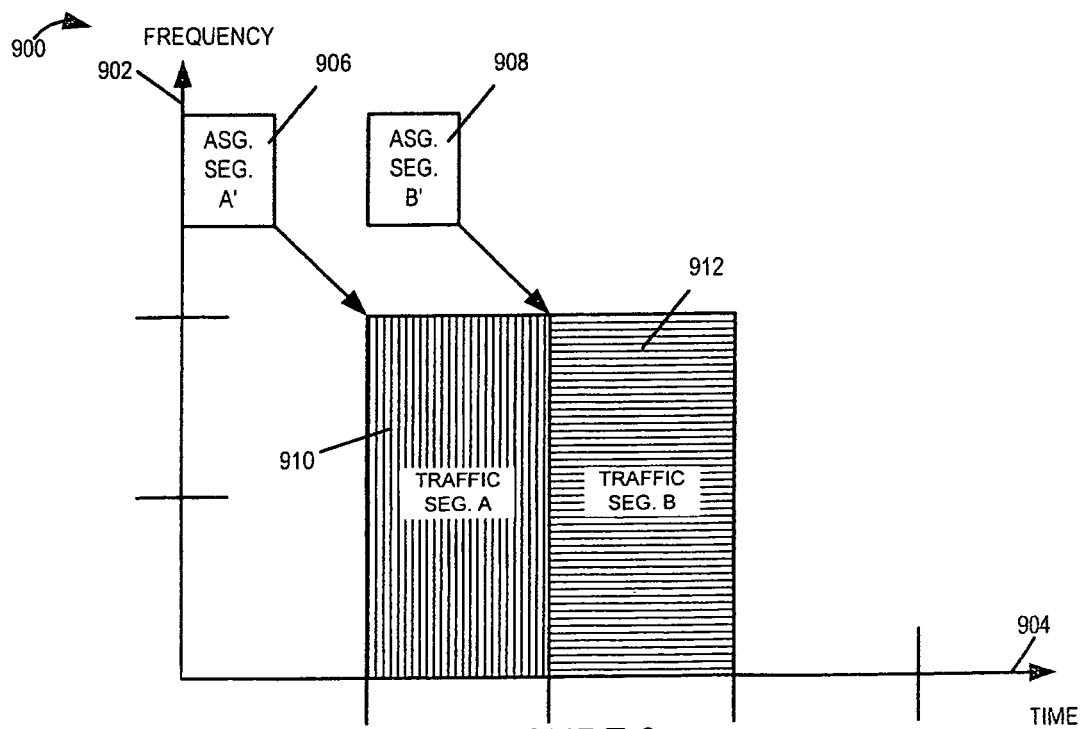
FIG. 9 is a drawing 900 illustrating the correspondence between assignment and traffic segments.

In the exemplary system of the present invention, the assignment information of downlink (and uplink) traffic channel segments to users is transported in the assignment channel, which includes a series of assignment segments. Each traffic segment is associated with a unique assignment segment. An assignment segment can, and in some embodiments does, convey assignment information about one or more traffic segments. The assignment segment associated with one or more given traffic segment(s) conveys the assignment information for the associated traffic segment(s). The assignment information may include the identifier of the user terminal(s), which is assigned to utilize the associated traffic segment(s), and also the coding and modulation scheme to be used in the associated traffic segment(s). FIG. 9 is a drawing 900 illustrating the correspondence between assignment and traffic segments. FIG. 9 includes a vertical axis 902 representing frequency vs a horizontal axis 904 representing time, and is used for plotting exemplary assignment and traffic segments. For example, FIG. 9 shows two assignment segments, A'906 and B'908, which convey the assignment information corresponding to the associated traffic segments A 910 and B 912, respectively. The assignment channel is a shared channel resource. The users receive the assignment information conveyed in the assignment channel and then utilize the traffic channel segments according to the assignment information. Assignment segments could be contained in any one pipe or more generally be split across many or each of the pipes to provide maximum diversity.

Data transmitted by the base station on a downlink traffic segment is decoded by a receiver in the intended wireless terminal while data transmitted by the assigned wireless terminal on the uplink segment is decoded by a receiver in the base station. Typically the transmitted segment includes redundant bits that help the receiver determine if the data is decoded correctly. This is done because the wireless channel may be unreliable and data traffic, to be useful, typically has high integrity requirements.

Because of interference, noise and/or channel fading in a wireless system, the transmission of a traffic segment may succeed or fail. In the exemplary system of the present invention, the receiver of a traffic segment sends an acknowledgment to indicate whether the segment has been received correctly. The acknowledgment information corresponding to traffic channel segments is transported in the acknowledgment channel, which includes a series of acknowledgment segments. Each traffic segment is associated with a unique acknowledgment segment. For a downlink traffic segment, the acknowledgment segment is in the uplink. For an uplink traffic segment, the acknowledgment segment is in the downlink. At the minimum, the acknowledgment segment conveys one-bit of information, e.g., a bit, indicating whether the associated traffic segment has been received correctly or not. Because of the predetermined association between uplink traffic segments and acknowledgement segments, there may be no need to convey other information such as the user identifier or segment index in an acknowledgment segment. Acknowledgement segments could be included in any one pipe or more generally be split across many or each of the pipes to provide maximum diversity.

Figure 10:
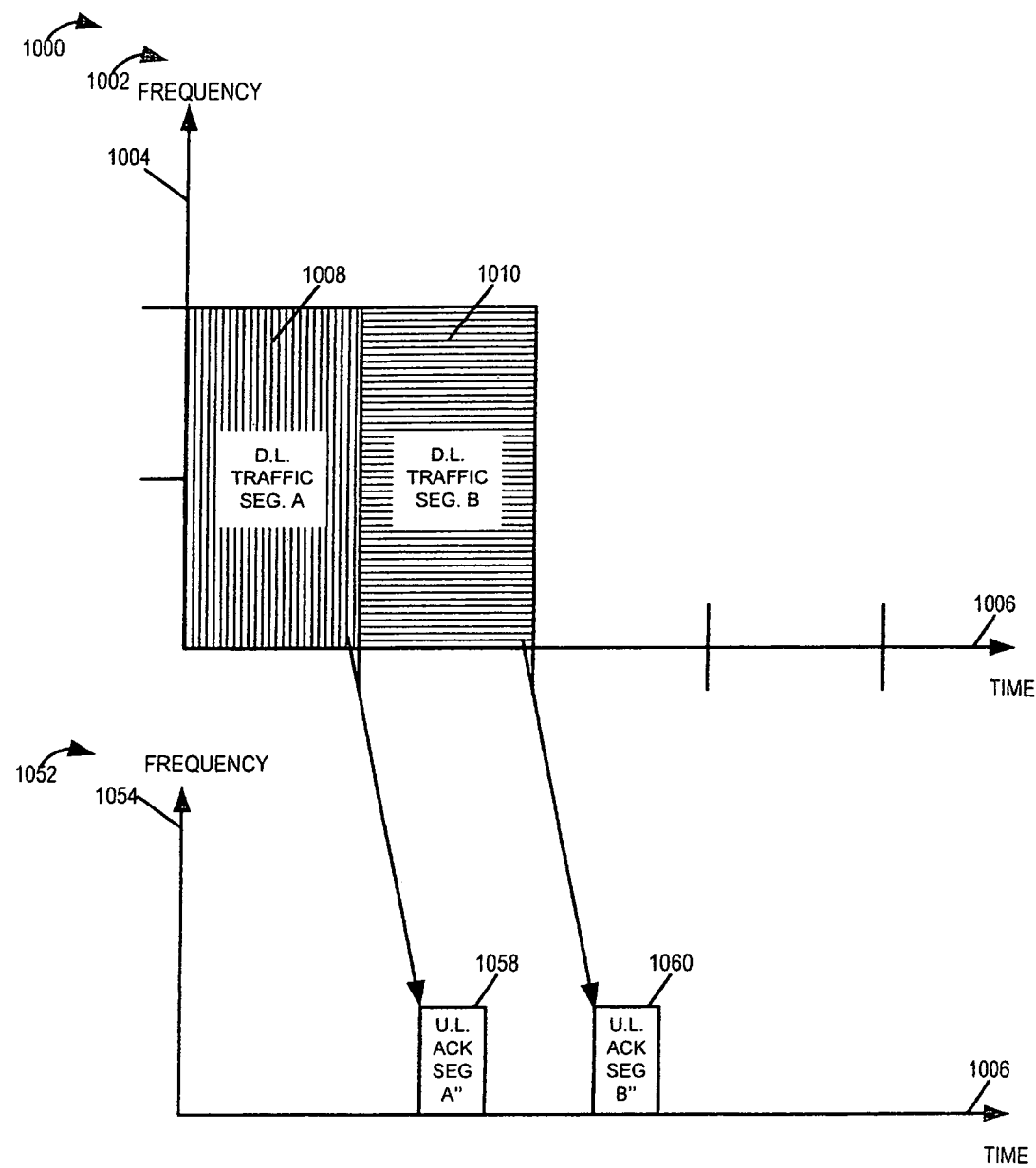
FIG. 10 is a drawing illustrating acknowledgements sent in response to traffic segments received.

An acknowledgment segment is normally used by the user terminal that utilizes the associated traffic segment and not other user terminals. Thus, in both the links (uplink and downlink) the acknowledgment channel is a shared resource, as it can be used by multiple users, e.g., with different users using different segments at different times. While being a shared resource, there is no contention that results from the use of the acknowledgment channel, as there is no ambiguity in which user terminal is to use a particular acknowledgement segment. FIG. 10 is a drawing 1000 illustrating acknowledgements sent in response to traffic segments received. FIG. 10 includes a drawing 1002 of frequency on the vertical axis 1004 vs time on the horizontal axis 1006 used for illustrating downlink traffic segments. In drawing 1002, exemplary downlink traffic segment A 1008 and exemplary downlink traffic segment B 1010 are shown. FIG. 10 also includes a drawing 1052 of frequency on the vertical axis 1054 vs time on the horizontal axis 1056 used for illustrating acknowledgements segments of an uplink acknowledgement segment channel that may be used to transmit acknowledgement signals sent in response to received downlink traffic segment signals. Drawing 1052 of FIG. 10 shows two uplink acknowledgment segments, A" 1058 and B" 1060, which convey the acknowledgment information of downlink traffic segments A 1008 and B 1010.

FIG. 1 illustrates a basic embodiment of the invention in the framework of the exemplary OFDM system described above. In this embodiment, the available bandwidth is divided in frequency into four parallel pipes, labeled as 'A' 106, 'B' 108, 'C' 110 and 'D' 112, which can be used to serve different users simultaneously. Each of the pipes 106, 108, 110, 112 is associated with its own two-antenna transmission technique as will be described below. Extension to more than two antennas is possible.

The spread-spectrum properties of the exemplary OFDM system are obtained by allowing logical tones to periodically hop in a pseudo-random manner across the available bandwidth. In the context of this invention, each of the parallel pipes could maintain a spread-spectrum property within the bandwidth in which it is defined. Tones used in all the channels defined in a particular pipe are hopped in a pseudo-random manner across the frequency band/bands in which the pipe is defined. More generally, the logical tones in the system could hop across the bandwidth resources of two or more pipes.

In accordance with the invention, the measurement of the channel quality of each of the parallel pipes should be facilitated. In the context of the exemplary system, pilot tones can be used to facilitate channel quality measurements. Channel quality measurements may include signal-to-interference ratio (SIR) and fading characteristics. In this embodiment, each parallel pipe contains its own pilot tones. The densities of pilots used in each pipe can be varied to suit the transmission technique employed as will be discussed below. In one exemplary embodiment, the mobile receiver estimates the channel quality on the pipes. Based on the channel quality estimates, the receiver then determines the best pipe to receive the data traffic segments on. The mobile receiver then reports this pipe selection along with the channel quality estimate on the pipe to the base station. The structure of the channel estimate report may be different for different pipes depending on the transmission technique used in the pipe.

The independent channel estimation of multiple parallel pipes facilitates the pipe selection process. This concept allows the mobile receiver to perform pipe selection in cooperation with the base station transmitter.

In a more general setting, a user receiver may determine that the best traffic segments for it to receive data are the ones that are split across two or more pipes. In this case the mobile receiver indicates this selection of traffic segments to the base station along with the channel quality estimate. Here the channel quality estimate is formed based on the channel quality estimates of the corresponding pipes that the segments are split across.

The base station as well as the mobile terminals may use a common control channel in addition to traffic data and assignment channels. The control channel may be used to communicate power control and/or other control information. The control channel resources could be entirely included in one pipe or, more generally, be split into two or more pipes.

In the example illustration in FIG. 1, pipe A 106, is formed from two non-contiguous bands 10A and 106B while pipes B 108, C 110 and D 112 are each formed from resources in a contiguous band of spectrum. The idea behind having many pipes is to use the two available base station transmit antennas differently in each pipe so that different pipes likely have different channel quality for different user terminals. In FIG. 1, pipes 'B' 108, 'C' 110 and 'D' 112 are optimized for transmission to user terminals whose channel is varying relatively slowly compared with the frequency of channel quality feedback and thus the channel quality can be tracked reliably at the base station, e.g., low mobility or stationary users. In this scenario, the technique of switched opportunistic beamforming is complemented with intelligent scheduling that exploits multi-user diversity is a natural application. Opportunistic beamforming as described in U.S. Provisional Patent Application Ser. No. 09/691,766 which is hereby incorporated by reference, is a technique that is used to exploit multiuser diversity in scenarios where mobile users experience quasi-static or slowly varying channels. In this technique, the base station transmitter uses multiple transmit antennas to deliberately create channel fluctuations which can be exploited by an opportunistic scheduler to increase system capacity. In switched opportunistic beamforming, the base station transmitter has the additional advantage of being able to create independent opportunistic beams in multiple parallel pipes. The mobile receivers can track the variations of the wireless channel over all the pipes and report a preferred pipe back to the base station along with the channel quality on that pipe. The induced channel variations can be coordinated between the parallel pipes in such a manner that it is very likely that at least one of the pipes is substantially better than the others. This technique can realize the available transmit diversity gain offered by two transmit antennas along with any available frequency diversity gain plus beamforming gain. In a cellular deployment where different base stations use the same (or similar) pipe structure, a user terminal is likely to select a pipe which has a good channel to the desired base station and a not so good channel to the interfering base station. The resulting additional gain is termed as opportunistic cell coordination gain. In the remaining part of this description, the pipes denoted 'B' 108, C' 110 and 'D' 112 will be referred to as 'opportunistic beamforming pipes' and it is assumed that they can use the switched opportunistic beamforming technique described in U.S. Provisional Patent Application Ser. No. 09/691,766 which is hereby incorporated by reference including each of the generalizations of the technique.

Figure 4:
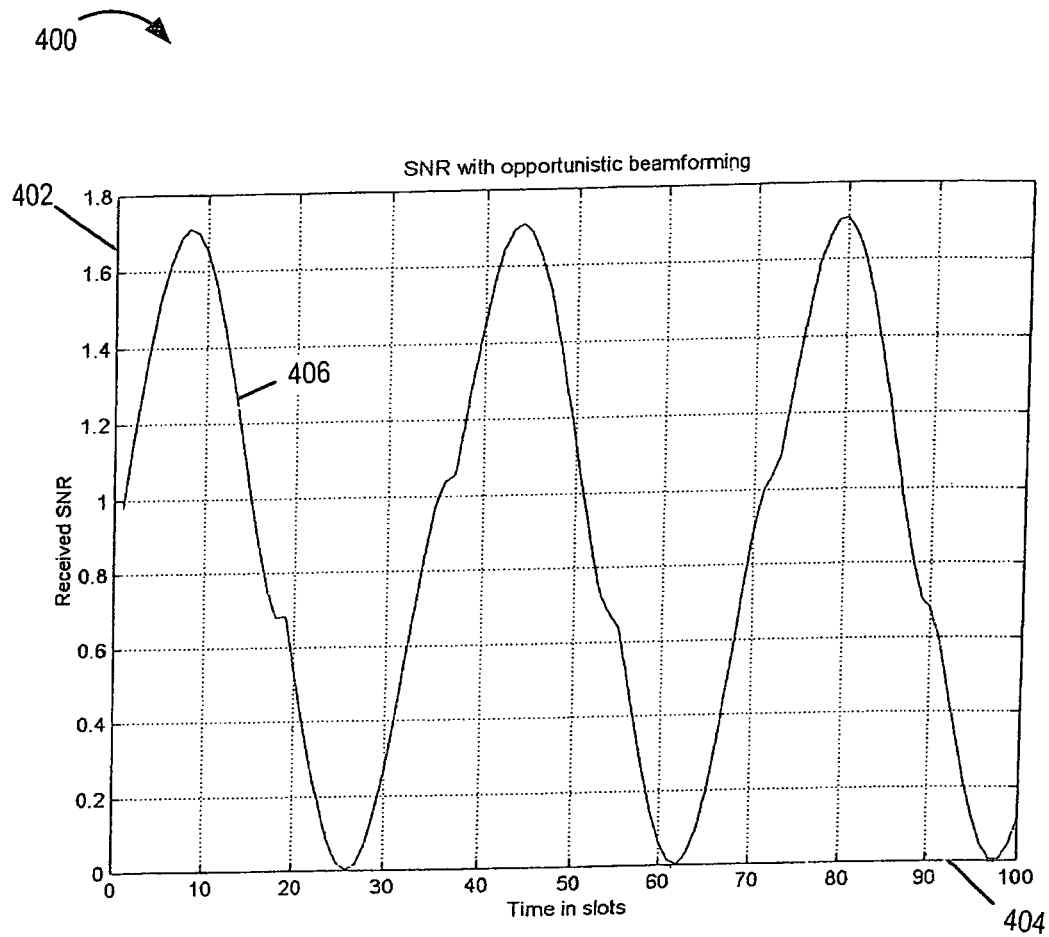
FIG. 4 is a graph illustrating the channel variations a mobile receiver may perceive when the base station uses a single opportunistic beam.
Figure 5:
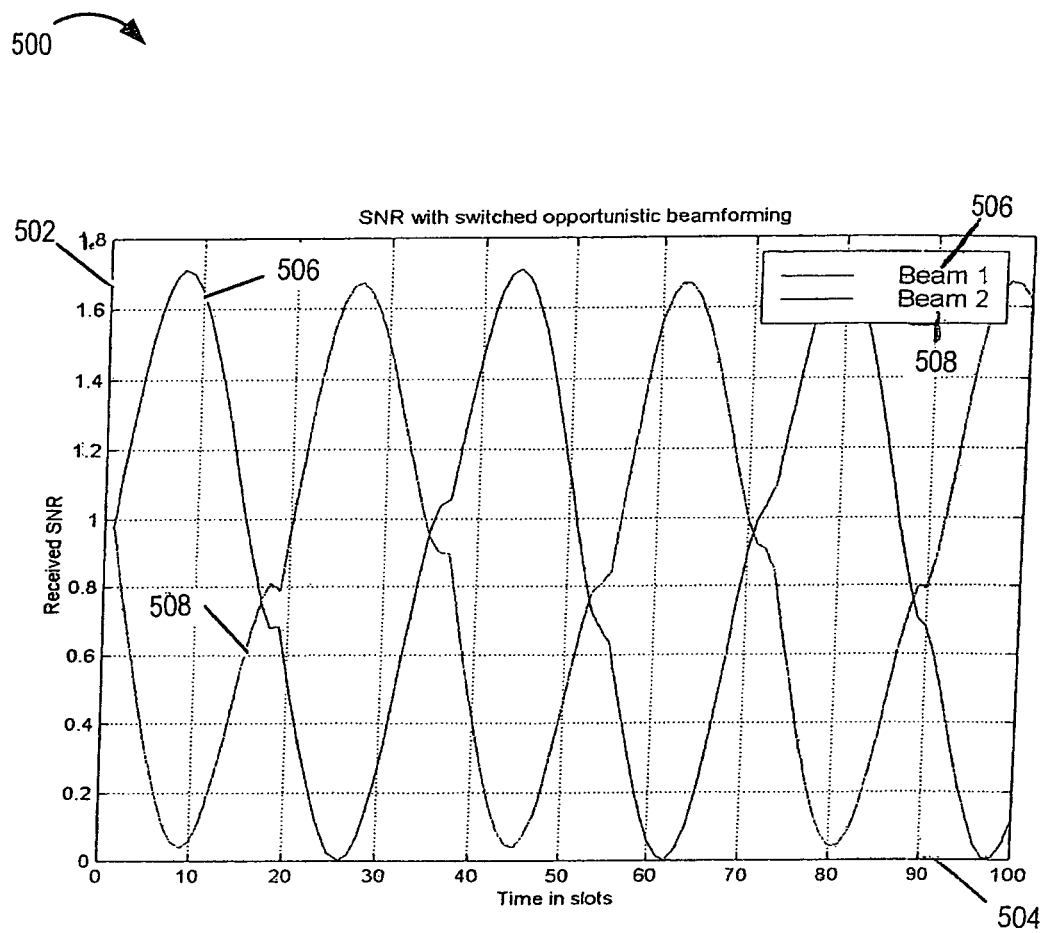
FIG. 5 is a graph 500 illustrating the channel variations perceived by a mobile receiver when the base station uses two opportunistic beams that are offset in phase.

The concept of switched opportunistic beamforming may be motivated using an example using two transmit antennas FIG. 4 is a graph 400 illustrates the channel variations perceived by a mobile receiver when the base station uses a single opportunistic beam. Graph 400 includes a vertical axis 402 representing received SNR, a horizontal axis 404 representing time in slots, and a plot 406 of SNR experienced by a receiver with a single opportunistic beam. FIG. 5 is a graph 500 illustrating the channel variations perceived by a mobile receiver when the base station uses two opportunistic beams that are offset in phase. In FIG. 5, the base station produces two opportunistic beams on different pipes that are offset in phase from each other. Graph 500 includes a vertical axis 502 representing received SNR, a horizontal axis 504 representing time in slots, a plot 506 of SNR experienced by a receiver with respect to beam 1, and a plot 508 of SNR experienced by a receiver with respect to beam 2. The receiver sees the channel quality varying over time on any particular pipe and, in general, perceives high channel quality on one of the pipes (and corresponding beams) when another pipe (and corresponding beam) offer low channel quality, as illustrated in FIG. 4 and FIG. 5. It is easy to see that using two beams can effectively reduce the latency at the receiver in waiting for a time instant when the channel quality is high and the receiver can select between the beams depending on their channel qualities. The receiver is in a position to select the strongest among these beams and report the pipe associated with the selected beam (and the corresponding channel quality) to the transmitter, such that the transmitter can send traffic to the receiver with the pipe of the best channel quality.

In the context of this invention, assume that the base station transmitter uses two antennas in each of pipes 'B' 108, 'C' 110 and 'D' 112 for the purpose of creating opportunistic beams. Consider a mobile receiver and denote the time-varying channel responses from the two transmit antennas to that receiver as $h_\alpha(t)$ and $h_\beta(t)$ respectively. For clarity of description, it is assumed that the channel response from either antenna to the receiver is constant across frequency, and hence constant across the multiple pipes. However, this assumption does not diminish or constrain the invention in any way. Let $\{\alpha_1(t),\alpha_2(t),\alpha_3(t)\}$ and $\{\beta_1(t),\beta_2(t),\beta_3(t)\}$ be time-varying coefficients used to modulate the signals on the first and second antenna respectively in the pipes 'B' 108, C' 110 and 'D' 112. If the signals to be transmitted over the opportunistic beamforming pipes are denoted by $$\overline{S}(t)=\{S_B(t),S_C(t),S_D(t)\},$$

then the actual physical signals that are transmitted over the pipes from the two antennas can be represented by $$\overline{S^{(1)}}(t)=\{\alpha_1(t)S_B(t),\alpha_2(t)S_C(t),\alpha_3(t)S_C(t)\}$$

$$\overline{S^{(2)}}(t)=\{\beta_1(t)S_B(t),\beta_2(t)S_C(t),\beta_3(t)S_C(t)\}$$

Therefore, the signals received by the receiver in the opportunistic beamforming pipes are given by $$R_B(t)=S_B(t)[h_\alpha(t)\alpha_1(t)+h_\beta(t)\beta_1(t)]$$

$$R_C(t)=S_C(t)[h_\alpha(t)\alpha_2(t)+h_\beta(t)\beta_2(t)]$$

$$R_D(t)=S_D(t)[h_\alpha(t)\alpha_3(t)+h_\beta(t)\beta_3(t)]$$

Hence, when the invention is applied to the system with two transmit antennas and multiple parallel pipes, the composite channel response in k-th parallel pipe from the transmitter to the receiver is effectively given by $\alpha_k(t)h_\alpha(t)+\beta_k(t)h_\beta(t)$.

With a suitable choice of the values of the coefficients $\{\alpha_k(t)\}$ and $\{\beta_k(t)\}$ at the transmitter, at least one of the opportunistic beamforming pipes will likely have higher composite channel quality than the composite channel responses of the other pipes. The choice of the coefficients $\{\alpha_k(t),\beta_k(t)\}$ is quite flexible. In one embodiment, $\{\alpha_k(t)\}$ is set to a constant, $\{\beta_k(t)\}$ is set to be a constant-amplitude complex number with phase being rotated with time:

$$\alpha_k(t)=1$$

$$\beta_k(t)=\exp(j2\pi f_{rot}t+\upsilon_k)$$

where the phase offsets $\{\upsilon_k\}$ are uniformly distributed in $[0,2\pi]$. In this example, since there are pipes employing opportunistic beamforming, the phase offsets may be chosen as $$\upsilon_1 = 0, \upsilon_2 = \frac{2\pi}{3}, \upsilon_3 = \frac{4\pi}{3}.$$

This particular embodiment results in three opportunistic beams that each rotates with frequency $f_{rot}$. In general, these phase offsets need not be uniformly distributed as described above. The offset between the beams may even be changed at a slow rate in order to optimize the system for a particular spatial distribution of users.

In the more general case $\beta_k$ could also be a function of frequency, in particular $\beta_k(t,f)=\exp(j2\pi f_{rot}t+j2\pi\Delta f+\upsilon_k)$, where $\Delta$ represents delay in one antenna's signal over the other. This generalization also covers the case where the signal transmitted from one of the antennas on pipes B 108, C 110 and D 112 is simply a delayed version of the signal transmitted on the other antenna. This delay results in a frequency selective fading of the channel at the receiver. In other words, some part of the band covering pipes B 108, C 110 and D 112 has destructive interference at the receiver from the two signals and other part of the band may have constructive interference. Consequently a pipe included in the part of the band where the signals from the two antennas add constructively has better channel quality than other pipes where the signal adds destructively. By selecting the best pipe in this case the user terminal can realize beamforming gain.

In another embodiment, each of the pipes may effectively be transmitted on a subset of the available antennas. For example, in the case where there are two transmit antennas, each pipe may be transmitted using one of the antennas. This may be achieved by setting the magnitudes of $(\alpha_k,\beta_k)$ to be close to (1,0) or (0,1). The mobile terminals may perceive higher channel quality with respect to either of the antennas and thus select an appropriate pipe and report this selection to the base station. Further, this choice of pipe can vary dynamically with time as the channels with respect to the transmit antennas change.

The idea of the switched opportunistic beamforming paradigm is that the transmitter sends multiple offset beams on different pipes, the receiver independently measures the channel qualities of the parallel pipes and reports to the transmitter the best pipe and measurement results on that pipe. The transmitter sends traffic to the receiver on that pipe. To benefit from switched opportunistic beamforming, the receiver does not need to estimate $h_\alpha(t)$ and $h_\beta(t)$ explicitly, but is only required to measure the aggregate SNR on the pipes.

Having the choice of pipes B 108, C 110 and D 112 helps those users whose channel quality can be tracked at the transmitter. For users that move fast the channel quality cannot always be tracked at the base station transmitter because of delay in the feedback. These users may not benefit from the switched opportunistic beamforming scheme described above. In this situation, diversity techniques that serve to increase diversity gain by averaging across multiple, independent fading processes are suitable. Many such techniques typically only require that the channel be estimated and tracked at the receiver and no feedback to the transmitter is needed.

Pipe A 106, in FIG. 1 can be optimized to serve this category of users. One space-time code that can be used in pipe A 106, to provide transmit diversity gain in accordance with the invention is the Alamouti scheme described in S. M. Alamouti, "A simple transmitter diversity scheme for wireless communications," IEEE Journal on Selected Areas in Communication, vol. 16, pp. 1451-1458, Oct. 1998. In this technique, two transmit antennas are employed in the following manner. Assume that the pipe denoted 'A' 106 has two transmit antennas. Let the signal that is communicated over the pipe be denoted by S(t) where t is assumed to be a discrete time instant. In the Alamouti scheme, two consecutive symbols are blocked off and transmitted over two time instants using the two antennas. Let $X_1(t)$ and $X_2(t)$ represent the output signals from the two antennas respectively, which may be expressed as $$\begin{bmatrix} X_1(t) & X_1(t+1) \\ X_2(t) & X_2(t+1) \end{bmatrix} = \begin{bmatrix} S(t) & -S^*(t+1) \\ S(t+1) & S^*(t) \end{bmatrix}$$

Suppose that the time-varying channel responses from the two antennas to the mobile receiver are denoted by $h_1(t)$ and $h_2(t)$ respectively (for simplicity we assume a flat channel but more general case where the channel is frequency dependent can also be handled easily). If the channel coefficients are assumed to remain constant over two symbols, which is a mild assumption, the composite signal received by the mobile receiver can be represented by $$Y(t)=h_1X_1(t)+h_2X_2(t)+W(t)$$

$$Y(t+1)=h_1X_1(t+1)+h_2X_2(t+1)+W(t+1)$$

which may be rewritten in terms of the original signal S(t) as $$\begin{bmatrix} Y(t) \\ Y(t+1) \end{bmatrix} = \begin{bmatrix} h_1 S(t) + h_2 S(t+1) + W(t) \\ -h_1 S^*(t+1) + h_2 S^*(t) + W(t+1) \end{bmatrix}$$

or alternatively, $$\begin{bmatrix} Y(t) \\ Y^*(t+1) \end{bmatrix} = \begin{bmatrix} h_1 & h_2 \\ h_2^* & -h_1^* \end{bmatrix} \begin{bmatrix} S(t) \\ S(t+1) \end{bmatrix} + \begin{bmatrix} W(t) \\ W^*(t+1) \end{bmatrix}$$

If the channel responses from the two antennas are known, it is straightforward to invert the transmitter code construction and extract the transmitted signal by the following transformation:

$$\begin{bmatrix} \hat{S}(t) \\ \hat{S}(t+1) \end{bmatrix} = \begin{bmatrix} h_1^* & h_2 \\ -h_2 & h_1 \end{bmatrix} \begin{bmatrix} Y(t) \\ Y(t+1) \end{bmatrix} = (|h_1|^2 + |h_2|^2) \begin{bmatrix} S(t) \\ -S(t+1) \end{bmatrix} + \text{noise}$$

which results in second-order diversity over a fading channel.

In addition to the transmit diversity technique employed, frequency diversity can help to combat frequency-selective fading. For this reason, the pipe denoted 'A' 106 is located in such a manner that it is defined over two parts 106A, 106B that are separated in frequency. The transmitted data is coded jointly over the two parts 106A, 106B that comprise pipe 'A' 106. With the Alamouti scheme employed using two transmit antennas at the base station and data coded across two pipe parts separated in frequency by more than the coherence bandwidth of the wireless channel, the mobile receiver can see fourth order diversity which sufficiently compensates for the rapidly fading channel.

In order that the channel response from each of the transmit antennas be estimated at the mobile receiver, pipe 'A' 106 allows for two sets of pilot tones. One set is transmitted only from the first antenna while the second set is transmitted from the second antenna.

In the basic embodiment, each mobile receiver monitors its own channel characteristics in the different pipes and makes a selection. The user terminal reports this selection back to the base station along with proper channel condition feedback. For example, if the user determines that it is of low mobility, it may select the best of the opportunistic beamforming pipes B 108, C 110 or D 112 and report the aggregate SNR received on the preferred pipe. If the user is in a high mobility situation and experiences rapid fading, it indicates a choice of pipe A 106 which employs the Alamouti technique to the base station along with the channel quality on pipe A 106. The base station scheduler may choose to allocate a traffic segment to this user over the selected pipe, in which case the user is notified through the assignment channel.

The techniques illustrated in this basic embodiment are only representative of the potential of this invention. To reiterate, the invention allows for the creation of different pipes and the employment of different multiple antenna transmit techniques within those pipes in conjunction with receiver selection diversity.

There can be a number ways of generalizing the above basic embodiment. Some of the generalization schemes are discussed below.

Figure 11:
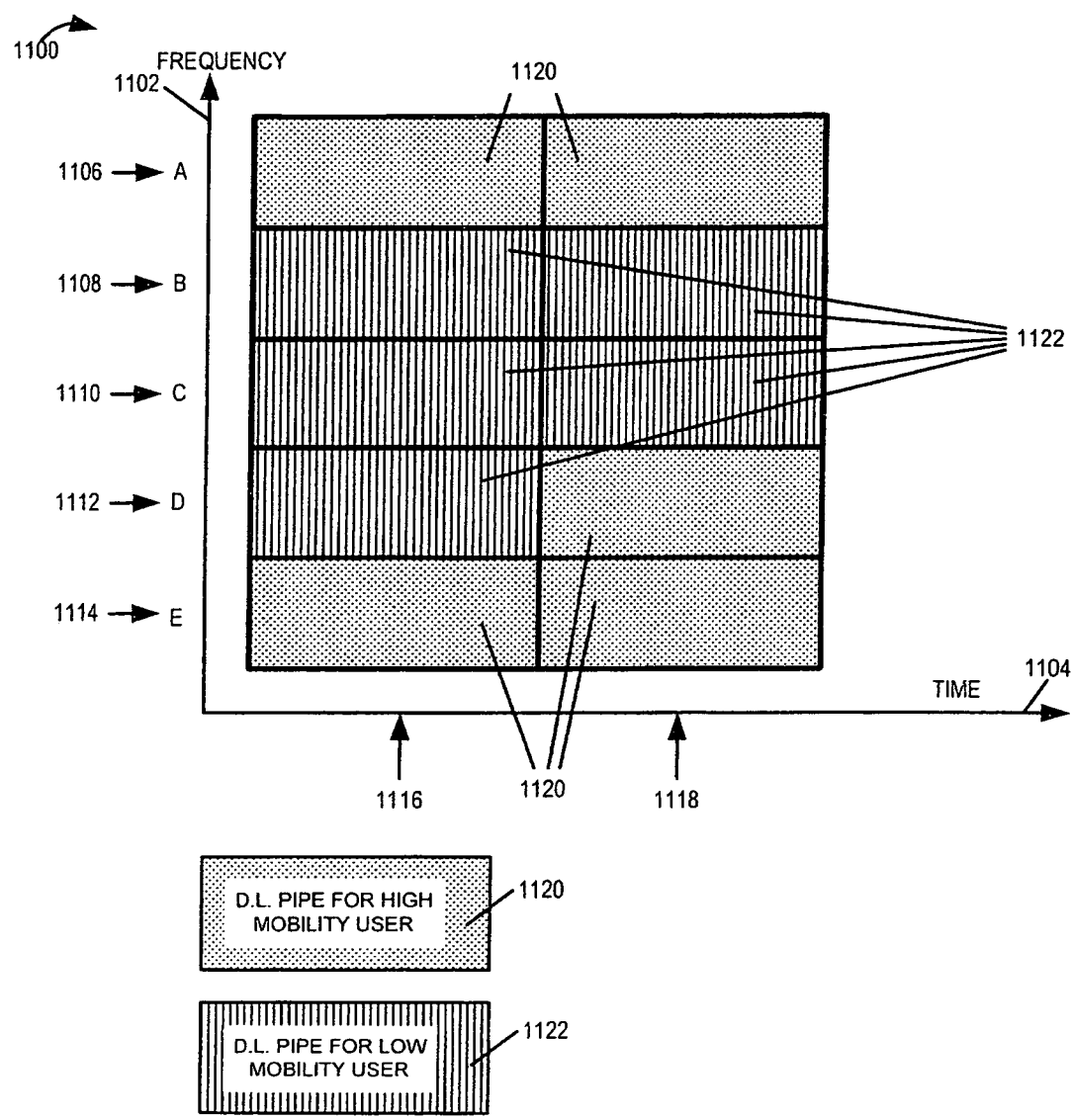
FIG. 11 shows an alternative embodiment where the technique used in a given pipe can be changed dynamically from time to time.

In one scheme, the transmit techniques that are used in individual pipes are dynamically changed. In the embodiment of FIG. 1, the choice of techniques in individual pipes is fixed and is known by the users served by the base station. FIG. 11 shows an alternative embodiment where the technique used in a given pipe can be changed dynamically from time to time. FIG. 11 is a drawing 1100 of frequency on the vertical axis 1102 vs time on the horizontal axis 1104. Available bandwidth is subdivided into physical frequency bands, A 1106, B 1108, C 1110, D 1112, and E 1114. The time domain is subdivided in slots, slot 1 1116, slot 2 1118. During time slot 1 1116, each frequency band A 1106, E 1114 represents a pipe for a high mobility user 1120, while each frequency band B 1108, C 1110, and D 1112 represents a pipe for a low mobility user 1122. During time slot 2 1118, each frequency band A 1106, D 1112, E 1114 represents a pipe for a high mobility user 1120, while each frequency band B 1108, C 1110 represents a pipe for a low mobility user 1122. In that embodiment, the base station may broadcast the choice of the technique periodically. The two embodiments shown in FIG. 1 and FIG. 11 can be mixed to lead to another embodiment where some pipes use fixed techniques while others use techniques that can dynamically vary.

In another generalization scheme, the decision of which pipe to use for a given user can also be made at the base station. In this case instead of reporting the decision, the user may just report the preference of which pipe to use, and it is up to the base station to determine which pipe to actually serve the user. The user terminal may actually even report a subset of preferred pipes and the associated channel condition reports. One advantage of this embodiment is that the base station has the freedom to schedule on any of the pipes and therefore can better balance the loads among the pipes. The disadvantage may be the need to feedback more information.

In general, wireless terminals can employ a variety of mechanisms and formats to feed back their channel condition and characteristics. In one embodiment each terminal can report a list of preferred pipes when it connects with the base station. Later, the wireless terminal updates the base station when its preferred pipes change. Such updates can occur in an asynchronous manner. In an alternative embodiment, each terminal can periodically report to the base station a list of preferred pipes. In addition to the choice of the preferred pipe, the terminal also reports the channel quality estimate on the pipe (such as SNR) to the base station. The frequency of reporting the channel condition can be different from, and preferably faster than, that of reporting the preferred pipes. Moreover, the format of the channel condition reports can be different depending on the preferred pipes.

The advantages of this invention can be realized in multiuser systems that encompass a wide variety of devices. Wireless terminals that feature multiple antennas are in a position to realize MIMO channels in cooperation with the multiple transmit antennas at the base station, especially if they experience a rich multipath structure in the wireless channels. If these devices are in a position to track the channel matrix of the channel response coefficients associated with each of the transmit and receive antennas, a rich family of space-time codes can be used for data transmission. One or more of the pipes in the system can be dedicated to provide service to such devices, which would indicate their capabilities and choice of pipe to the base station through a control channel. As an extension of this concept, one pipe can be dedicated to transmit space-time codes that maximize spatial multiplexing gain for mobiles whose channel conditions support it. Another pipe can be dedicated for space-time codes where the degrees of freedom are used to provide diversity instead of high data rates for mobiles that may require it. Naturally, the mobiles may prefer not to select a MIMO-optimized pipe if their wireless channels are unsuitable.

The invention is described in this document with a set of transmit techniques used in an illustrative manner. The invention applies equally well to other multiple-antenna transmit techniques which may be used in independent pipes as described in this document.

Figure 12:
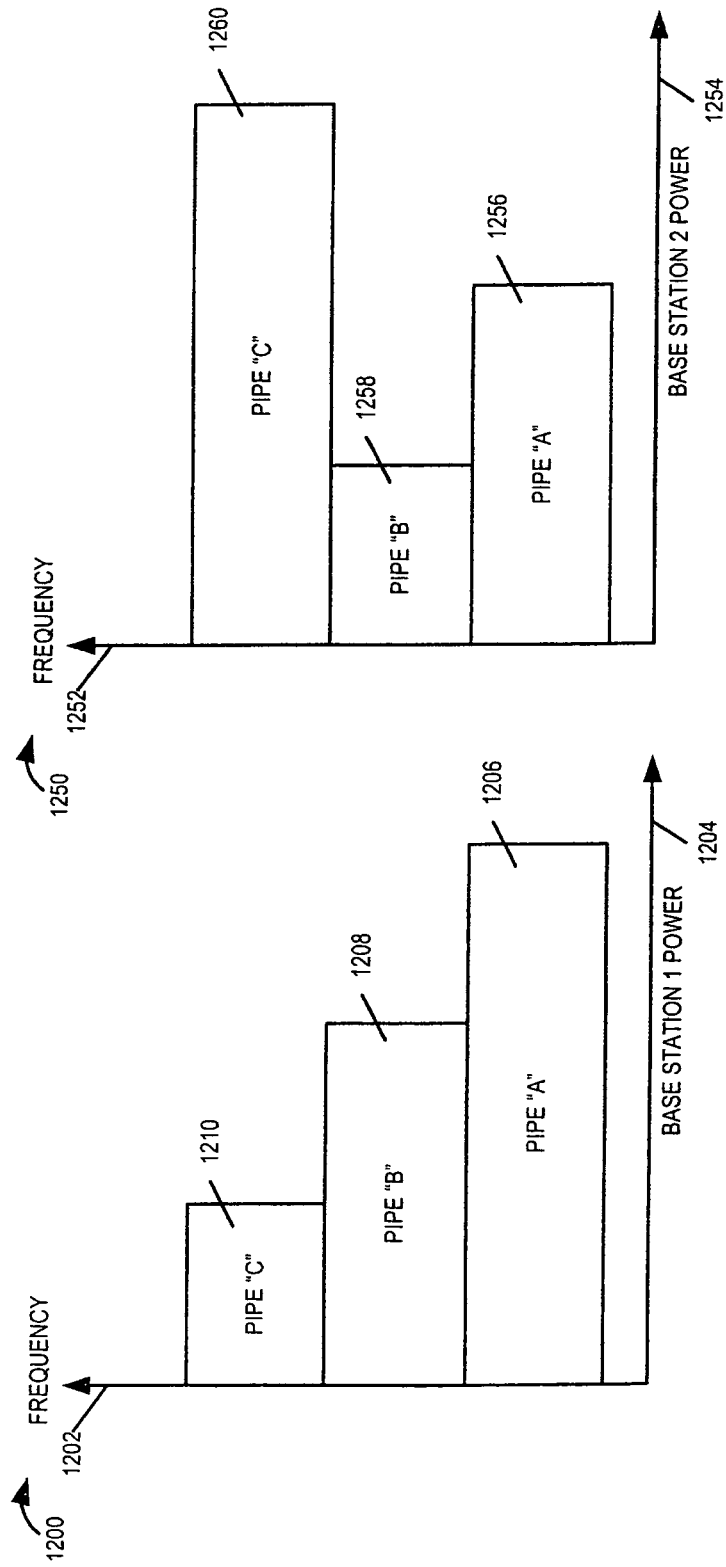
FIG. 12 illustrates the use of different transmit powers on different pipes.

Thus far, the total power available on each pipe has not been considered. Different embodiments of this invention could choose the total transmit power in different ways. One straightforward choice would result in the total transmit power per degree of freedom being the same in each of the parallel pipes. Alternatively, the transmit powers can be different on different pipes as illustrated in FIG. 12. This illustration is an embodiment of this invention where two adjoining base stations choose the transmit powers in such a manner that the cell boundaries are likely to different for different pipes. FIG. 12 includes a graph 1200 corresponding to base station 1 and a graph 1250 corresponding to base station 2. Graph 1200 includes a vertical axis 1202 representing frequency and a horizontal axis 1204 representing base station 1 transmit power level. Block 1206 represents the base station 1 transmit power for pipe A; block 1208 represents base station 1 transmit power for pipe B; block 1210 represents base station 1 transmit power for pipe C. Graph 1250 includes a vertical axis 1252 representing frequency and a horizontal axis 1254 representing base station 2 transmit power level. Block 1256 represents the base station 2 transmit power for pipe A; block 1258 represents base station 2 transmit power for pipe B; block 1260 represents base station 2 transmit power for pipe C. With regard to A pipes, block 1206 represents a high power level, while block 1256 represents an intermediate power level. With regard to B pipes, block 1208 represents an intermediate power level, while block 1258 represents a low power level. With regard to pipe C, block 1210 represents a low power level, while block 1260 represents a high power level. Thus, a wireless terminal is likely to not be at a cell boundary on each of the pipes simultaneously. This improves the capacity of the system. This power allocation is not necessarily static either. The total transmit power can be varied at a slow rate for each of the parallel pipes. Power allocation also becomes important when a traffic segment is transmitted across multiple pipes. The base station can allocate power differently across the pipes in accordance with the respective channel conditions on the pipes with respect to the wireless terminal receiving the segment.

Figure 13:
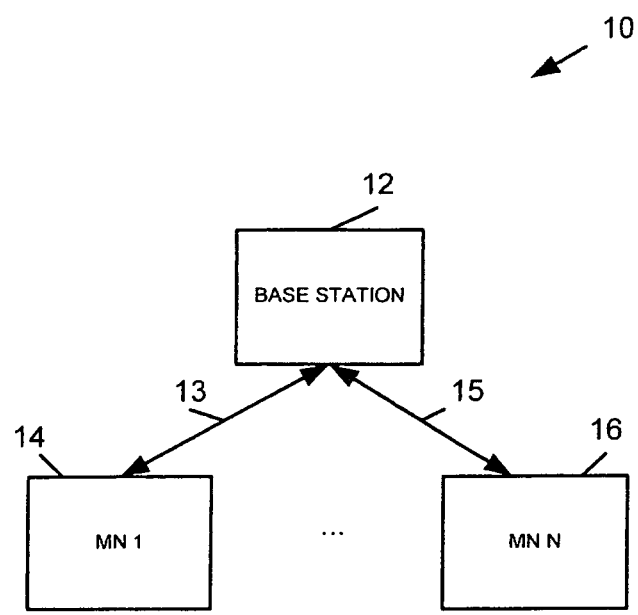
FIG. 13 illustrates an exemplary communications system 10 implemented in accordance with the invention.

FIG. 13 illustrates an exemplary communications system 10 implemented in accordance with the invention. In the system 10, multiple mobile terminals, shown as mobile nodes MN 1 (14) through MN N (16) communicate with the base station 12 through the use of communication signals 13, 15. Each mobile terminal may correspond to a different mobile user and are therefore sometimes referred to as user terminals. The signals 13, 15 may be, e.g., OFDM signals. The signals 13, 15 may be transmitted using one or more pipes between an MN and the base station 12. The base station 12 and mobile stations 14, 15 each implement the method of the present invention. Thus, signals 13, 15 include various signals of the types discussed above, which are transmitted in accordance with the invention.

Figure 14:
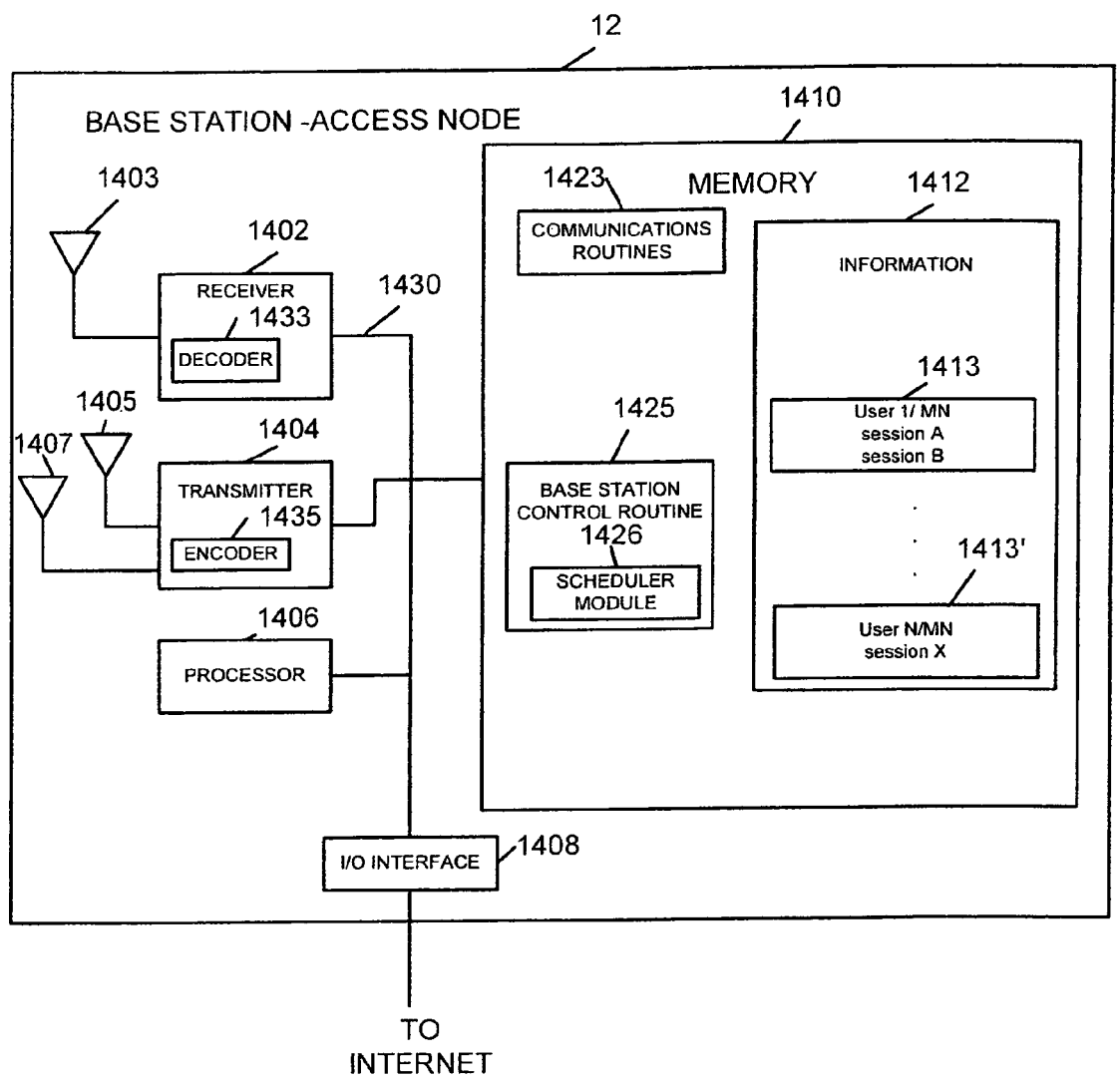
FIG. 14 illustrates an exemplary access router, e.g., base station 12, implemented in accordance with the invention.

FIG. 14 illustrates an exemplary access router, e.g., base station 12, implemented in accordance with the invention. The base station 12 includes antennas 1403, 1405, 1407 and receiver transmitter circuitry 1402, 1404. Multiple, e.g., two or more, transmit antennas 1405, 1407 are used to facilitate beam forming and multiple transmit pipes with different characteristics, to each pipe. The receiver circuitry 1402 includes a decoder 1433 while the transmitter circuitry 1404 includes an encoder 1435. The circuitry 1402, 1404 is coupled by a bus 1430 to an I/O interface 1408, processor (e.g., CPU) 1406 and memory 1410. The I/O interface 1408 couples the base station 12 to the Internet and to other network nodes. The memory 1410 includes routines, which when executed by the processor 1406, cause the base station 12 to operate in accordance with the invention. Memory includes communications routines 1423 used for controlling the base station 12 to perform various communications operations and implement various communications protocols. The memory 1410 also includes a base station control routine 1425 used to control the base station 12 to implement the steps of the method of the present invention described above in the sections which discuss, e.g., a base station or an access router, operation and signaling. The base station control routine 1425 includes a scheduling module 1426 used to control transmission scheduling and/or communication resource allocation. Transmission scheduling is based in various embodiments, on information about channel characteristics on different pipes received from one or more mobile nodes. Thus, module 1426 may serve as a scheduler. Memory 1410 also includes information used by communications routines 1423, and control routine 1425. The information 1412 includes an entry for each active mobile station user 1413, 1413' which lists the active sessions being conducted by the user and includes information identifying the mobile station (MT) being used by a user to conduct the sessions.

Figure 15:
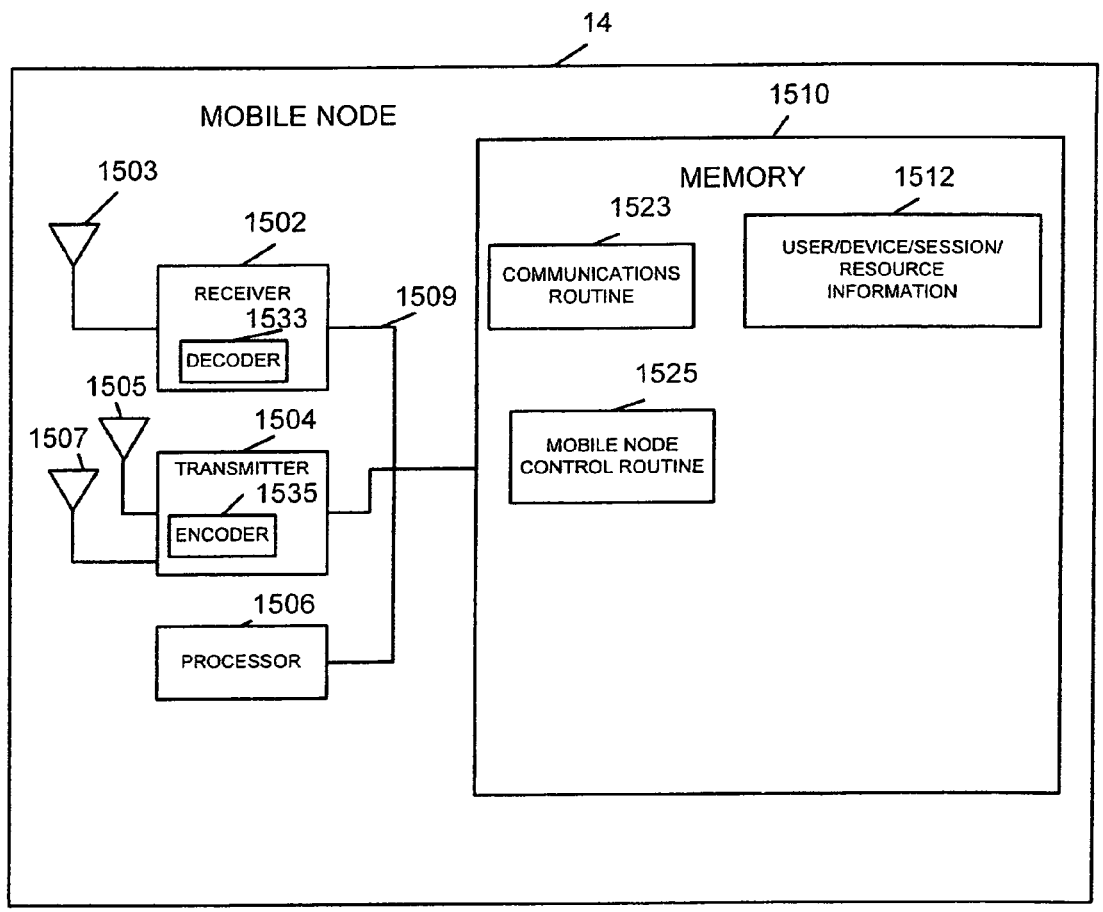
FIG. 15 illustrates an exemplary mobile node 14 implemented in accordance with the present invention.

FIG. 15 illustrates an exemplary mobile node 14 implemented in accordance with the present invention. The mobile node 14 may be used as a mobile terminal (MT). The mobile node 14 includes receiver and transmitter antennas 1503, 1505, 1507 which are coupled to receiver and transmitter circuitry 1502, 1504 respectively. Multiple transmitter antennas 1505, 1507 are used to support beamforming and multiple transmit pipes to a BS with different characteristics. The receiver circuitry 1502 includes a decoder 1533 while the transmitter circuitry 1504 includes an encoder 1535. The receiver transmitter circuits 1502, 1504 are coupled by a bus 1509 to a memory 1510. Processor 1506, under control of one or more routines stored in memory 1510 causes the mobile node to operate in accordance with the methods of the present invention as described above. In order to control mobile node operation memory includes communications routine 1523, and mobile node control routine 1525. The mobile node control routine 1525 is responsible for insuring that the mobile node operates in accordance with the methods of the present invention and performs the steps described above in regard to mobile node operations. The memory 1510 also includes user/device/session/resource information 1512 which may be accessed and used to implement the methods of the present invention and/or data structures used to implement the invention.

Figure 16:
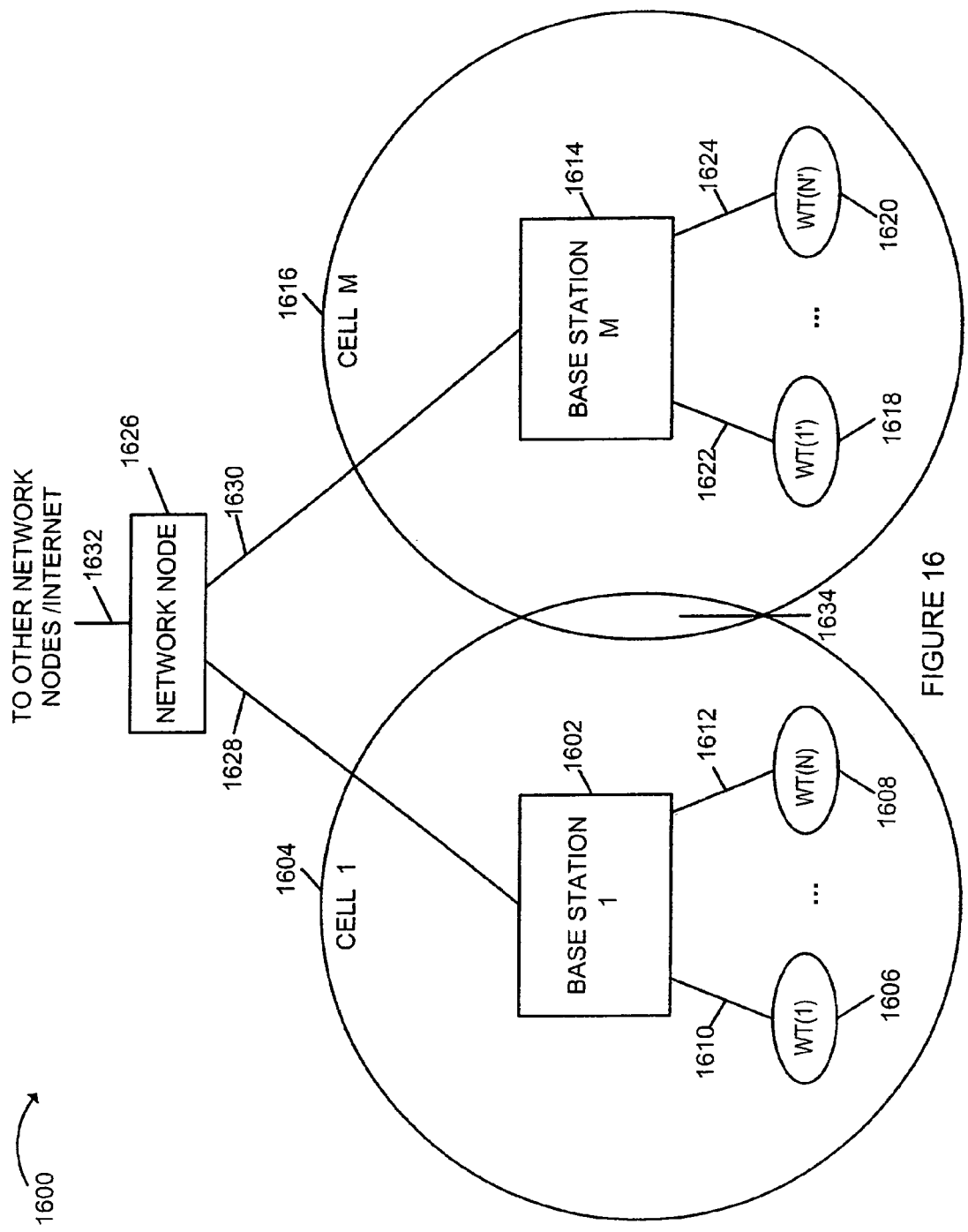
FIG. 16 is an illustration of an exemplary wireless communications system 1600, implemented in accordance with the present invention.

FIG. 16 is an illustration of an exemplary wireless communications system 1600, implemented in accordance with the present invention. Exemplary wireless communications system 1600 includes a plurality of base stations (BSs): base station 1 1602, base station M 1614. Cell 1 1604 is the wireless coverage area for base station 1 1602. BS 1 1602 communicates with a plurality of wireless terminals (WTs): WT(1) 1606, WT(N) 1608 located within cell 1 1604. WT(1) 1606, WT(N) 1608 are coupled to BS 1 1602 via wireless links 1610, 1612, respectively. Similarly, Cell M 1616 is the wireless coverage area for base station M 1614. BS M 1614 communicates with a plurality of wireless terminals (WTs): WT(1') 1618, WT(N') 1620 located within cell M 1616. WT(1') 1618, WT(N') 1620 are coupled to BS M 1614 via wireless links 1622, 1624, respectively. WTs (1606, 1608, 1618, 1620) may be mobile and/or stationary wireless communication devices. Mobile WTs, sometimes referred to as mobile nodes (MNs), may move throughout the system 1600 and may communicate with the base station corresponding to the cell in which they are located. Region 1634 is a boundary region between cell 1 1604 and cell M 1616.

Network node 1626 is coupled to BS 1 1602 and BS M 1614 via network links 1628, 1630, respectively. Network node 1626 is also coupled to other network nodes/Internet via network link 1632. Network links 1628, 1630, 1632 may be, e.g., fiber optic links. Network node 1626, e.g., a router node, provides connectivity for WTs, e.g., WT(1) 1606 to other nodes, e.g., other base stations, AAA server nodes, home agent nodes, communication peers, e.g., WT(N'), 1620, etc., located outside its currently located cell, e.g., cell 1 1604.

Figure 17:
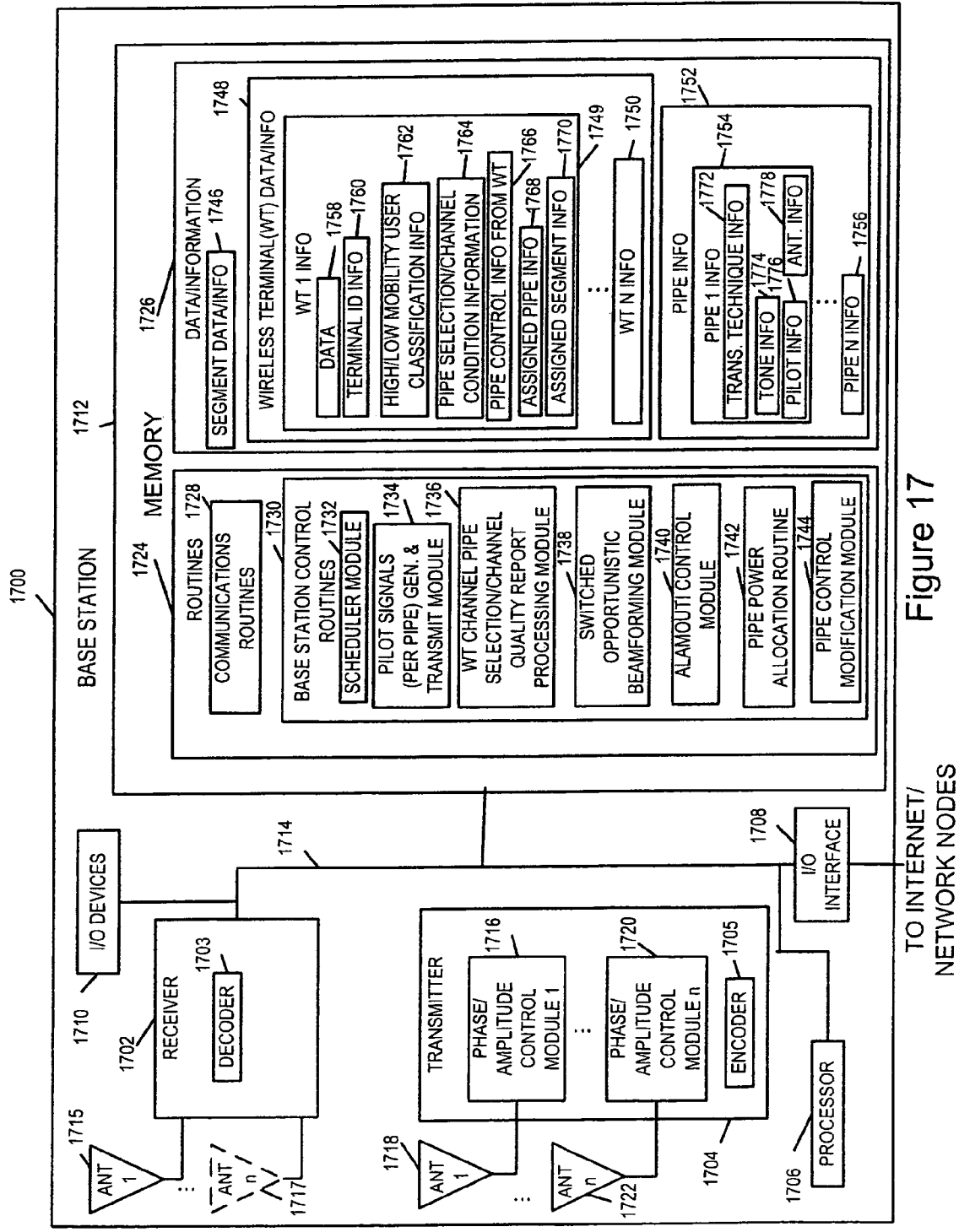
FIG. 17 illustrates an exemplary base station implemented in accordance with the present invention.

FIG. 17 illustrates an exemplary base station 1700, implemented in accordance with the present invention. Exemplary BS 1700 may be a more detailed representation of any of the BSs, BS 1 1602, BS M 1614 of FIG. 16. BS 1700 includes a receiver 1702, a transmitter 1704, a processor, e.g., CPU, 1706, an I/O interface 1708, I/O devices 1710, and a memory 1712 coupled together via a bus 1714 over which the various elements may interchange data and information. In addition, the base station 1700 includes a receiver antenna 1 1715 which is coupled to the receiver 1702. In some embodiments, e.g., a MIMO embodiment, base station 1700 includes additional receiver antenna(s), receiver antenna n 1717 coupled to receiver 1702. The base station 1700, as shown in FIG. 3, also includes multiple transmitter antennas, (antenna 1718, antenna n 1722) coupled to transmitter 1704. Transmitter antennas 1718, 1722 are used for transmitting information, e.g., downlink traffic channel information, independent pilot signals on each pipe, and/or assignment information from BS 1700 to WTs 1800 (see FIG. 18) while receiver antenna(s) 1715, 1717 is used for receiving information, e.g., channel condition feedback information, pipe selection information, and/or pipe control information, as well as data, from WTs 1800.

The memory 1712 includes routines 1724 and data/information 1726. The processor 1706 executes the routines 1724 and uses the data/information 1726 stored in memory 1712 to control the overall operation of the base station 1700 and implement the methods of the present invention. I/O devices 1710, e.g., displays, printers, keyboards, etc., display system information to a base station administrator and receive control and/or management input from the administrator. I/O interface 1708 couples the base station 1700 to a computer network, other network nodes, other base stations 1700, and/or the Internet. Thus, via I/O interface 1708 base stations 1700 may exchange customer information and other data as well as synchronize the transmission of signals to WTs 1700 if desired. In addition I/O interface 1708 provides a high speed connection to the Internet allowing WT 1800 users to receive and/or transmit information over the Internet via the base station 1700.

Receiver 1702 includes a decoder 1703. Receiver 1702 uses decoder 1703 to processes signals received via receiver antenna(s) 1715, 1717 and extracts from the received signals the information content included therein. The extracted information, e.g., data, channel condition feedback information for each pipe, pipe selection, and/or pipe control information, is communicated to the processor 1706 and stored in memory 1712 via bus 1714.

Transmitter 1704 includes an encoder 1705 which encodes data/information, e.g., blocks of downlink traffic channel data/information, prior to transmission. Transmitter 1704 transmits information, e.g., data, assignment information, and/or pilot signals on each pipe to WTs 1800 via multiple antennas, e.g., antennas 1718, 1722. Transmitter 1704 includes a plurality of phase/amplitude control modules, phase/amplitude control module 1 1716, phase/amplitude control module n 1720. In the illustrated example of FIG. 17, a separate phase/amplitude control module, (1716, 1720) is associated with each of the transmit antennas (1718, 1722), respectively. The antennas 1718, 1722 at the BS 1700 are spaced far enough apart so that the signals from the antennas 1718, 1722 go through statistically independent paths, and thus the channels the signals go through are independent of each other. The distance between antennas 1718, 1722 is a function of the angle spread of the WTs 1800, the frequency of transmission, scattering environment, etc. In general, half a wavelength separation between antennas, based on the transmission frequency, is usually the sufficient minimum separation distance between antennas, in accordance with the invention. Accordingly, in various embodiments, antennas 1718, 1722 are separated by one half a wavelength or more, where a wavelength is determined by the carrier frequency $f_k$ of the signal being transmitted.

The phase and amplitude control modules 1716, 1720 perform signal modulation and control the phase and/or amplitude of the signal to be transmitted under control of the processor 1706. Phase/amplitude control modules 1716, 1720 introduce amplitude and/or phase variations into at least one of a plurality, e.g., two, signals being transmitted to a WT 1800 to thereby create a variation, e.g., an amplitude variation over time, in the composite signal received by the WT 1800 to which information is transmitted from multiple antennas 1718, 1722. The control modules 1716, 1720 are also capable of varying the data transmission rate, under control of the processor 1706, as a function of channel conditions and/or channel selection in accordance with the present invention. In some embodiments, phase/amplitude control modules 1716, 1720 change phase and/or amplitude by changing coefficients.

As mentioned above, the processor 1706 controls the operation of the base station 1700 under direction of routines 1724 stored in memory 1712. Routines 1724 include communications routines 1728, and base station control routines 1730. The base station control routines 1730 include a transmit scheduler module 1732, a pilot signals generation and transmission module 1734, a WT channel pipe selection/channel quality report processing module 1736, a switched opportunistic beamforming module 1738, a Alamouti control module 1740, a pipe power allocation module 1742, and a pipe control modification module 1744.

Data/Information 1726 includes segment data/information 1746, a plurality of wireless terminal (WT) data/information 1748, and pipe information 1752. WT data/information 1748 includes WT 1 information 1749 and WT N information 1750. Each WT information set, e.g., WT 1 information 1749 includes data 1758, terminal ID information 1760, high/low mobility user classification information 1762, pipe selection/channel condition information 1764, pipe control information from WT 1766, assigned pipe information 1768, and assigned segment information 1770.

Segment data/information 1746 includes data, e.g., user data, intended to be transmitted on downlink traffic segments to WTs 1800, located within the cell of BS 1700, and user data received on uplink traffic segments from WTs 1800. Data 1758 includes user data associated with WT 1, e.g., data received from WT 1 intended to be forwarded to a communication peer, e.g., WT N, and data receiver from a peer of WT 1, e.g., WT N, intended to be forwarded to WT 1. Terminal ID information 1760 includes a current base station assigned identity for WT 1. High/low mobility user classification information 1762 includes a classification of WT 1 as a high or low mobility user. In some embodiments, pipes, e.g., communication channels and/or segments may be divided and assigned by categories corresponding to a user's mobility classification. Pipe selection/channel condition information 1764 includes information from a WT feedback report indicating the WT's selected pipe(s), e.g., communication channel(s), and corresponding channel quality information, e.g., SNR, SIR, fading information, etc. Pipe control information from WT 1766 includes information from the WT 1800 instructing the BS 1700 to alter the selected pipe based on WT preferences. Assigned pipe information 1768 includes information identifying the specific pipe from a plurality of pipes which BS 1700 has assigned to WT 1800, e.g., for downlink traffic. Assigned pipe information 1768 also includes characteristics of the pipe, e.g., bandwidth, tones, data rate, modulation scheme, and/or any unique characteristic of the pipe incorporated due to the pipe control information communicated by the WT. Assigned segment information 1770 includes information identifying the segments assigned to the WT, e.g., the segments in the assigned pipe. In some embodiments, the WT shall request and be assigned specific segments, e.g., for downlink traffic channel information.

Pipe information 1752 includes a plurality of pipe information, pipe 1 information 1754, pipe N information 1756. Each pipe information set, e.g., pipe 1 information 1754 includes transmission technique information 1772, tone information 1774, pilot information 1776, and antenna information 1778. Transmission technique information includes information pertaining to the type of transmission technique(s) and/or technology selected for the pipe, e.g., OFDM, CDMA, an opportunistic beamforming technique, an Alamouti technique, etc. Tone information 1774 includes the bandwidth and/or set of tones allocated to the pipe as well as any tone hopping information relevant to the pipe. Pilot information 1776 includes information defining pilot signals to be generated for the pipe. By having independent pilot signals transmitted for each pipe, the WT can measure and estimate the channel quality for each pipe. Antenna information 1778 includes information indicating which corresponding antennas 1718, 1722 should be used for which signals components transmitted for the pipe.

Communications routines 1728 control the transmission and reception of data by transmitter 1704 and receiver 1702, respectively. Communications routines 1728 also implement various communications protocols used by BS 1700. Communications routines 1728 are also responsible for controlling the display and/or audio presentation of received information via I/O devices 1710.

Base station control routines 1730 control the operation of the base station 1700 and implement the methods of the present invention. Scheduler module 1732 schedules users, e.g., WTs to segments, e.g., downlink traffic segments, on assigned pipes, e.g., in response to selected pipe requests from the WTs. Pilot signals generation and transmission module 1734 generates and transmits pilot signals for each of the potential downlink pipes which may be assigned, thus allowing WTs to measure and evaluate independent channel estimates for each potential pipe. WT channel pipe selection/channel quality report processing module 1736 receives WT feedback reports including the WT's selected (preferred) pipe and associated channel quality report information, e.g., SNR, SIR, fading information. In some embodiments, the BS 1700 may receive information on a list of pipes that are acceptable to the WT. In some embodiments, the WTs may indicate specific requested segments for transmission. Module 1736 processes the received feedback information and makes decisions regarding pipe assignment between the various WTs requesting resources. The assignment decisions may be conveyed to the WTs in assignments segments. The switched opportunistic beamforming module 1738 is used in controlling the transmitter to perform opportunistic beamforming in designated pipes. Alamouti control module 1740 is used to control the transmitter perform Alamouti diversity techniques on designated pipes. Pipe power allocation routine 1742 is used to control the power levels assigned to each pipe. Pipe control modification module 1744 uses pipe control information from WT 1766, to alter pipes for specific wireless terminals, e.g., to customize a pipe based on the WT preferences communicated in information 1766.

Figure 18:
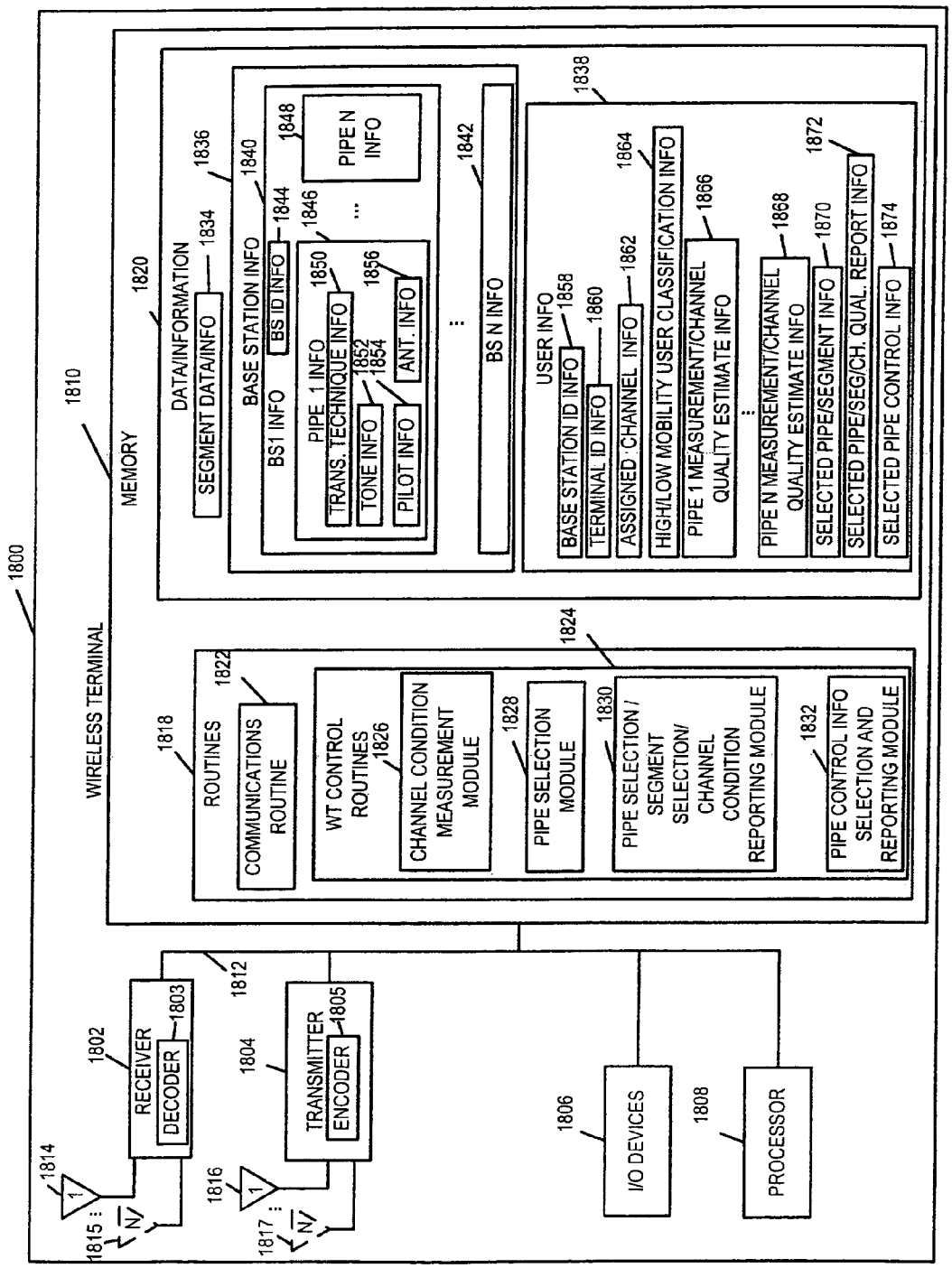
FIG. 18 illustrates an exemplary wireless terminal implemented in accordance with the present invention.

FIG. 18 illustrates an exemplary wireless terminal 1800, implemented in accordance with the present invention. Exemplary wireless terminal 1800 may be a more detailed representation of any of the WTs 1606, 1608, 1618, 1620 of exemplary system wireless communication system 1600 of FIG. 16. WT 1800 includes a receiver 1802, a transmitter 1804, I/O devices 1806, a processor, e.g., a CPU, 1808, and a memory 1810 coupled together via bus 1812 over which the various elements may interchange data and information. Receiver 1802 is coupled to antenna 1814. In some embodiments, e.g., MIMO embodiments, the receiver is coupled to additional antenna(s), antenna N 1815. Transmitter 1804 is coupled to antenna 1816. In some embodiments, e.g., using multiple uplink parallel pipes, multiple additional antenna(s), antenna N 1817, may be coupled to transmitter 1804. In some embodiments, a single antenna may be used in place of the two individual antennas 1814 and 1816.

Receiver 1802 includes a decoder 1803. Downlink signals transmitted from BS 1700 are received through antenna 1814 and/or 1815 and processed by receiver 1802 including decoding by decoder 1803 and recovery of user data. Transmitter 1804 includes an encoder 1805, which encodes user information prior to transmission. Transmitter 1804 transmits uplink signals through antenna 1816 and/or 1817 to BS 1700. Uplink signals include uplink traffic channel data/information, a selected downlink pipe, downlink pipe feedback channel estimation information for the associated selected pipe and/or for alternate pipes, and/or control information including instructions to the BS 1700 to alter the selected pipe or to form a pipe, e.g., through reallocation of resources, based on WT preferences, in accordance with the invention. I/O devices 1806 include user interface devices such as, e.g., microphones, speakers, video cameras, video displays, keyboard, printers, data terminal displays, etc. I/O devices 1806 may be used to interface with the operator of WT 1800, e.g., to allow the operator to enter user data, voice, and/or video directed to a peer node and allow the operator to view user data, voice, and/or video communicated from a peer node, e.g., another WT 1800.

Memory 1810 includes routines 1818 and data/information 1820. Processor 1806 executes the routines 1818 and uses the data/information 1820 in memory 1810 to control the basic operation of the WT 1800 and to implement the methods of the present invention. Routines 1818 include communications routine 1822 and WT control routines 1824. WT control routines 1824 include a channel condition measurement module 1826, a pipe selection module 1828, a pipe selection/segment selection/channel condition reporting module 1830, and a pipe control information selection and reporting module 1832.

Data/Information 1820 includes segment data/information 1834, base station information 1836, and user information 1838. Segment data/information 1834 includes user data, e.g., data/information to be transmitted to BS 1700 intended for a peer node in a communication session with WT 1800, downlink channel feedback information on the pipes, a selected downlink pipe(s), and/or selected pipe control information.

Base station information 1836 includes a plurality of sets of information, base station 1 information 1840, base station N information 1842. Base station information 1836 includes information specific to each base station, e.g., slope values that may be used in hopping sequences, carrier frequencies used by different base stations, modulation methods used by different base stations, beamforming variations that are base station dependent, division of available air link resources into pipes, e.g., channels, technologies used by different pipes. BS 1 info 1840 includes base station identification information 1844, and a plurality of base station pipe information sets, pipe 1 information 1846, pipe N information 1848. Pipe 1 information 1846 includes transmission technique information 1850, tone information 1852, pilot information 1854, and antenna information 1856. Base station ID information, e.g., a value of slope in an tone hopping sequence assigned to a particular BS 1700 in an OFDM system, allows the WT 1800 to identify the particular BS 1700 to which it is communicating. Transmission technique information 1850 includes information pertaining to the type of transmission technique(s) and/or technology for the pipe, e.g., OFDM, CDMA, an opportunistic beamforming technique, an Alamouti technique, etc. Tone information 1852 includes the bandwidth and/or set of tones allocated to the pipe as well as any tone hopping information relevant to the pipe. Pilot information 1854 includes information defining pilot signals to be received for the pipe. By having BS 1700 transmit pilot signals for each pipe, the WT 1800 can measure and estimate the channel quality independently for each pipe. Antenna information 1856 includes information indicating which corresponding antennas 1814, 1815 should be used for which signals components received for the pipe.

User information 1838 includes base station identification information 1858, terminal ID information 1860, assigned channel information 1862, high/low mobility user classification information 1864, a plurality of pipe measurement/channel quality estimation information (pipe 1 measurement/channel quality estimate information 1866, pipe N measurement/channel quality estimate information 1868), selected pipe/segment information 1870, selected pipe/selected segment/channel quality report information 1872, and selected pipe control information 1874.

User information 1838 includes information being currently used by WT 1800. Base station ID information 1858 includes identification information of the base station in whose cell WT 1800 is currently located, e.g., a value of slope used in a hopping sequence. Terminal ID information 1860 is a base station assigned ID used for current identification of WT 1800 by the BS 1700 in whose cell WT 1800 is located.

Assigned channel information 1862 includes downlink channel(s) assigned by the BS 1700 for the WT 1800 to expect user data to be transmitted on. Assigned channel information 1862 includes information identifying the specific pipe from a plurality of pipes which BS 1700 has assigned to WT 1800, e.g., for downlink traffic. Assigned channel information 1800 also includes characteristics of the pipe, e.g., bandwidth, tones, data rate, modulation scheme, and/or any unique characteristic of the pipe incorporated due to the pipe control information communicated by the WT 1800. Assigned channel information 1862 also includes information identifying the segments assigned to the WT 1800, e.g., the segments in the assigned pipe.

High/low mobility user classification information 1864 includes a classification of WT 1800 as a high or low mobility user. In some embodiments, pipes, e.g., communication channels and/or segments may be divided and assigned by categories corresponding to a user's mobility classification. Pipe 1 measurement/channel quality estimate information 1866 includes measurement information, e.g., received pilot signal measurement information, and estimation information corresponding to pipe 1, e.g., communication channel 1. Such information 1866 includes channel quality information, e.g., SNR, SIR, fading information, etc, corresponding to pipe 1. Pipe N measurement/channel quality estimate information 1868 includes measurement and estimation information similar to information set 1866 but corresponding to pipe N, e.g., communication channel N. Selected pipe/segment information 1870 includes a WT 1800 pipe selection and/or segment selections which are communicated to BS 1700. Selected pipe/selected segment/channel quality report information 1872 includes channel quality information, e.g., information derived from information sets 1866, 1868, corresponding to the WT selected pipe designated in information 1870, that shall be included in a feedback report to BS 1700. Selected pipe control information 1874 includes control information that shall be sent from the WT 1800 to BS 1700 instructing the BS 1700 to alter the selected pipe or to form a pipe, e.g., through reallocation of resources, based on WT 1800 preferences. In some embodiments, the WT shall request and be assigned specific segments, e.g., for downlink traffic channel information.

The communications routine 1822 controls the transmission and reception of data by transmitter 1804 and receiver 1802, respectively. Communications routine 1822 also implements the various communications protocols used by the WT 1800. Communications routine 1822 is responsive to scheduling information, received from BS 1700 to insure that uplink transmission data/information is transmitted by the WT 1800 at the times authorized by the BS 1700 and that downlink transmission data/information is received by WT 1800 at the appropriate times. Communications routines 1822 are also responsible for controlling the display and/or audio presentation of received information from BS 1700 to a user via I/O devices 1806.

WT control routines 1824 control the operation of the WT 1800 and implement methods of the present invention. Channel condition measurement module 1826 measures and estimates channel conditions for a plurality of pipes, e.g., channels, obtaining pipe 1 measurement/channel quality estimate information 1866, pipe N measurement channel quality estimate information 1868.

Pipe selection module 1828 compares channel measurement and/or estimation information, e.g., pipe 1 measurement/channel quality estimate information 1866, pipe N measurement/channel quality estimate information 1868, selects a channel, e.g., the channel with the best quality estimate, and stores the selection in selected pipe/segment info 1870. In some embodiments, the pipe selection module 1828 may select more than one pipe which may be used, e.g., a subset of pipes which have a quality level sufficient to support the needs of WT 1800. In some embodiments, the pipe selection module 1828 selects specific segments, e.g., specific downlink traffic segments, that WT 1800 would like to be BS 1700 to assign WT 1800.

Pipe selection/segment selection/channel condition reporting module 1830 uses data information 1820 including the selected pipe/segment info 1870 and the corresponding measurement/quality estimate information from info 1866, 1868 to generate a selected pipe/selected segment/channel quality report 1872. The reporting module 1830 in conjunction with the communications routine 1822 controls the transmitter 1804 to transmit the report information 1872 to the BS 1700.

Pipe control information selection and reporting module 1832 uses the data/information 1820 including high/low mobility user classification information 1864, selected pipe/segment information 1870, the characteristics of the selected pipe included in pipe info 1846, 1848, and/or characteristics of the segment data/information 1834, e.g., voice, data, video, data rate, etc., to generate selected pipe control information 1874. Pipe control information selection and reporting module 1832 in conjunction with the communications routine 1822 communicates the selected pipe control information 1874 to the BS 1700. In some embodiments, selected pipe, selected pipe channel quality feedback information and selected pipe control information are communicated in the same report to the BS 1700. In some embodiments, some of the set of selected channel, channel quality information, and selected pipe control information is communicated and used by the BS 1700, e.g., one of the three items, while the other information is not.

Figures 19, 19A:
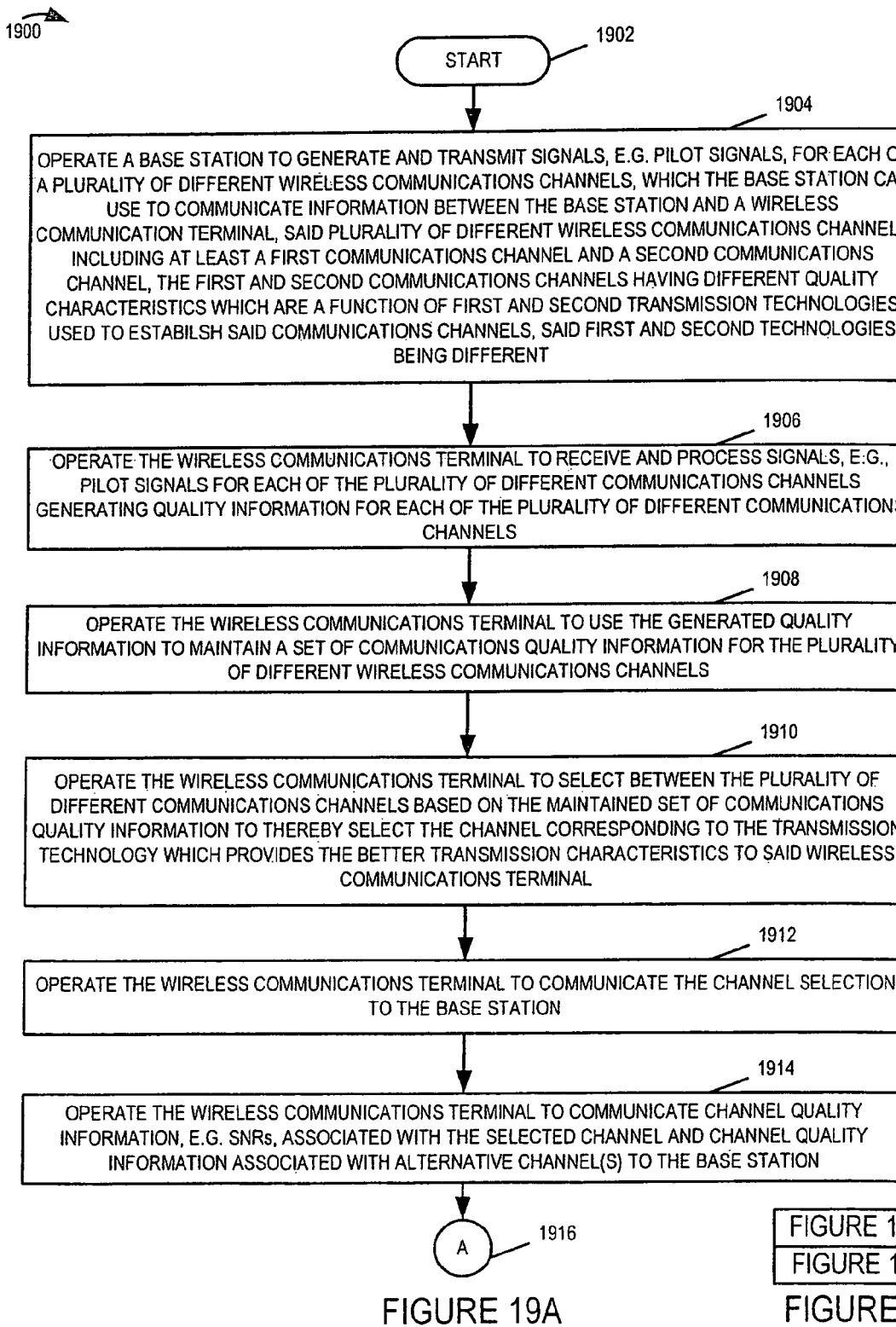
FIG. 19 is a flowchart illustrating an exemplary communications method in accordance with the present invention.
Figure 19B:
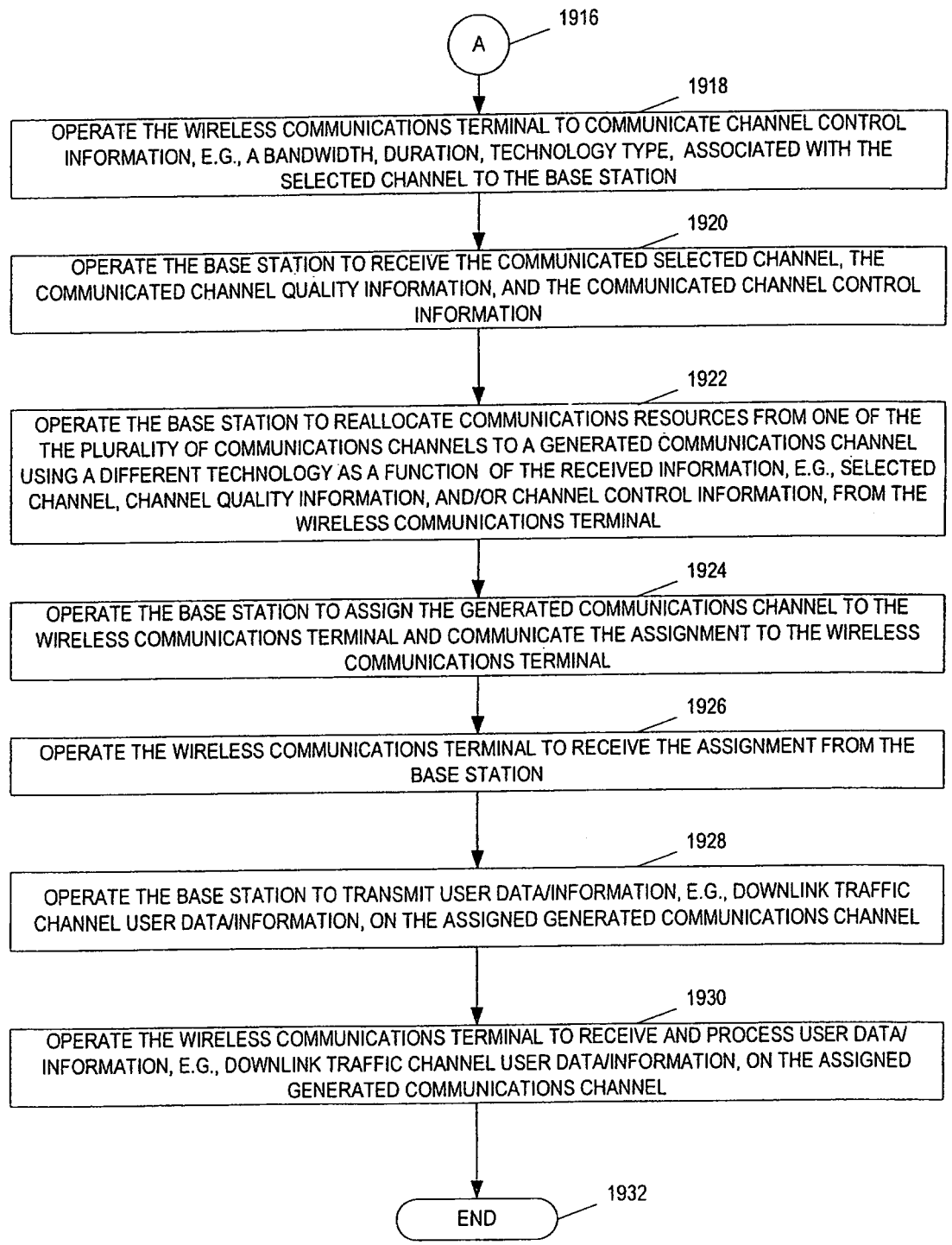

FIG. 19 is a flowchart 1900 illustrating an exemplary communications method in accordance with the present invention. Operation starts in step 1902 where the communications system is powered on and initialized. In step 1904 a base station is operated to generate and transmit signals, e.g., pilot signals, for each of a plurality of different wireless communications channels, which the base station can use to communicate information between the base station and a wireless communications terminal, said plurality of different wireless communications channels including at least a first communications channel and a second communications channel, the first and the second communications channels having different quality characteristics which are a function of first and second transmission technologies used to establish said communications channels, said first and second technologies being different. In some embodiments, the first and second technologies are different access technologies, e.g., different incompatible access technologies. In some embodiments, the different access technologies include at least two of the following technologies: CDMA, OFDM, and single carrier technology. In some embodiments, the different access technologies include frequency hopping technologies and non-frequency hopping technologies. In some embodiments, the different access technologies include different technologies defined on different technology standards which are incompatible as indicated by neither of the two standards complying to the other. Operation proceeds from step 1904 to step 1906.

In step 1906, the wireless communications terminal is operated to receive and process signals, e.g., pilot signals, for each of the plurality of different communications channels generating quality information for each of the plurality of different communications channels. Operation proceeds from step 1906 to step 1908. In step 1908, the wireless communications terminal is operated to use the generated quality information to maintain a set of communications quality information for the plurality of different wireless communications channels. Then, in step 1910, the wireless communications terminal is operated to select between the plurality of different communications channels based on the maintained set of communications quality information to thereby select the channel corresponding to the transmission technology which provides the better transmission characteristics to said wireless communication terminal. Next, in step 1912, the wireless communications terminal is operated to communicate the channel selection to the base station. In step 1914, the wireless communications terminal is operated to communicate channel quality information, e.g., SNRs, SIRs, fading information, etc., associated with the selected channel and with alternative channel(s) to the base station. Operation proceeds from step 1914 via connecting node A 1916 to step 1918. In step 1918, the wireless communications terminal is operated to communicate channel control information associated with the selected channel to the base station, e.g., a bandwidth, a duration, a technology type, etc. In some embodiments, the information communicated in steps 1912, 1914, and 1918 is communicated together in a signal, e.g., message. In some embodiments some of the information of steps 1912, 1914, and 1918 is not communicated to the base station, e.g., the wireless communication device transmits information from one of the three steps 1912, 1914, 1918, and does not transmit information corresponding to the other two steps. Operation proceeds from step 1918 to step 1920.

In step 1920, the base station is operated to receive the communicated selected channel, the communicated channel quality information, and the communicated channel control information. Then in step 1922, the base station is operated to reallocate communications resources from one of the plurality of communications channels to a generated communications channel using a different technology as a function of the received information, e.g., selected channel, channel quality information, and/or channel control information, from the wireless communications terminal. Operation proceeds from step 1922 to step 1924. In step 1924, the base station is operated to assign the generated communications channel to the wireless communication terminal and communicate the assignment information to the wireless communications terminal. Then, in step 1926, the wireless communications terminal is operated to receive the assignment from the base station. In step 1928, the base station is operated to transmit user data/information, e.g., downlink traffic channel user data/information, on the assigned generated communications channel. Then, in step 1930, the wireless communications terminal is operated to receive and process user data/information, e.g., downlink traffic channel user data/information, on the assigned generated communications channel. Operation proceeds from step 1930 to end node 1932.

Figure 20:
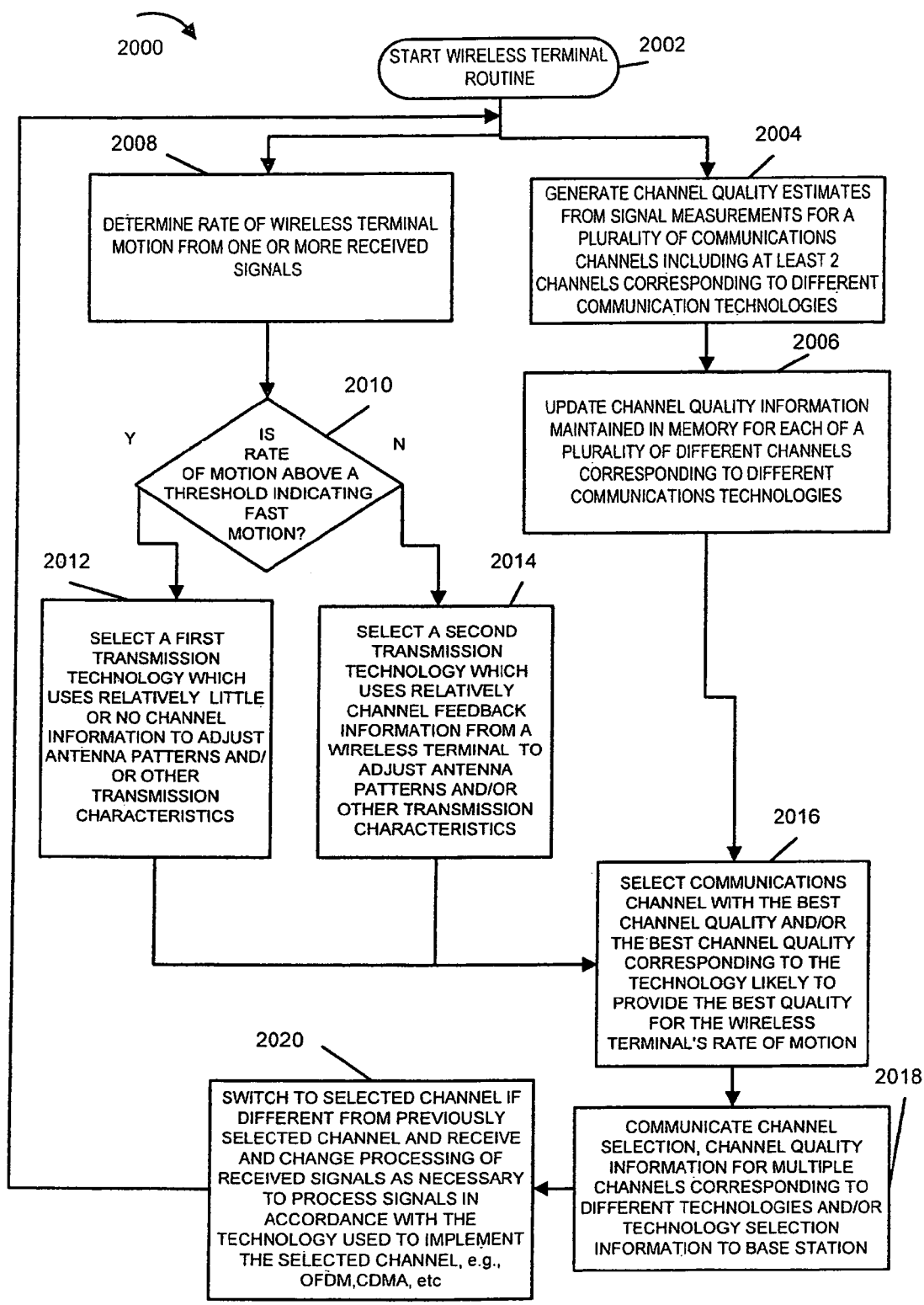
FIG. 20 illustrates a method performed by a wireless terminal in accordance with one exemplary embodiment of the invention.

FIG. 20 illustrates a flow chart 2000 showing the steps involved with the operation of a wireless terminal, e.g., exemplary mobile node, in accordance with the present invention. As shown in FIG. 20. The steps shown in FIG. 20 may be performed by a wireless terminal operating under software control where the software is implemented in accordance with the present invention and executed by the wireless terminals CPU. The routine starts in step 2002 when the control software is executed, e.g., upon wireless terminal activation or power up. Operation proceeds from start step to steps 2004 and 2008 which represent the start of parallel processing paths. The motion estimation path which starts in step 2008 is optional and not employed in some embodiments.

In step 2008 the wireless terminal determines, e.g., estimates, the rate of wireless terimain motion form one or more received signals. The received signals may be GPS position information signals, signals received from the base station instructing the wireless terminal to advance or delay its clock, e.g., as part of a symbol transmission timing adjustment, power control signals or other signals. Rate of motion may also be determined by measuring a Doppler shift in a signal received from the base station. With the rate of motion determined in step 2008, operation proceeds to step 2010 where the rate of motion is examined to determine if it is a fast or slow rate of motion. Other rate determinations are also possible. Form step 2010 operation proceeds to step 2012 or 2014 which involve selecting a technology to be used for communication to match the rate of motion. Step 2012 involves selection of a technology which is well suited for wireless terminals moving quickly. The method selected in step 2012 in some embodiments uses relatively little or no channel information to adjust BS antenna patterns and/or other base station transmission characteristics. The Alamoti communications method is one example of a communications technology which may be selected in step 2012 while other selections are also possible. Operation proceeds from step 2012 to step 2016.

In step 2014, which corresponds to a slow rate of motion, e.g., a rate of motion which is slower than the rate threshold value used in step 2010, a technology which is well suited for a slow moving or stationary wireless terminal is selected. The selected transmission or access technology selected in step 2012 uses channel feedback information from the mobile to adjust the antenna patterns and/or other transmission characteristics. The technology will, in many cases, involve the use of a higher channel feedback rate than is used for the technology which will be selected in step 2012. Thus, in accordance with the present invention, the selected technology in the case of a slow moving mobile may, and often does, involve more channel condition feedback information, e.g., SNR or SIR reports, to the base station than are provided by the wireless terminal in the case of a fast moving wireless terminal where the channel conditions change rapidly. Operation proceeds from step 2014 to step 2016.

In the processing path starting with step 2004, channel quality estimates are generated for multiple channels, e.g., channels corresponding to different and often incompatible communications technologies. In step 2004 channel quality estimates are generated for at least 2 channels corresponding to different communications technologies. Then, in step 2006 the channel quality information maintained in the wireless terminals memory for each of a plurality of different channels corresponding to different communications technologies is updated with at least the information generated in step 2004. Operation proceeds from step 2006 to step 20016.

In step 2016 the communications channel which the wireless terminal would prefer to use is selected based on the channel quality information, for example, the communications channel having the best channel quality is selected. This selection may be subject to the technology selection made in step 20012, 20014 and may therefore be based on the wireless terminal's rate of motion. In some embodiments motion rate information is not used in step 2016 in which case the wireless terminal will simply select the best channel as indicated by the sets of channel quality information maintained for each of the plurality of channels which are supported by the base station.

Operation proceeds from channel selection step 2016 to communication step 2018. Selection step 2016 may be skipped, e.g., omitted, in embodiments where the base station is responsible for channel selection. In such embodiments operation would proceed directly from steps 2006, and/or 20012, 2014 to step 2018. In step 2018 the wireless terminal communications a channel selection if a channel selection was made. The signal indicating a selected channel was generated from information indicating the channel quality of at least two different channels as a result of the selection process performed in step 2016. In addition and/or as an alternative to indicating a channel selection, the wireless terminal may generate and transmit to the base station one or more signals providing channel quality information for multiple channels, e.g., at least two channels corresponding to different technologies, and/or technology selection information, e.g., information indicating a selected transmission technology. In response to such signals the base station will normally assign one or more segment of a selected channel to the wireless terminal and/or make a channel selection based on the received information. The base station may, and in some embodiments does, create a channel corresponding to the selected technology and/or reallocate resources from a different channel to a channel corresponding to the selected technology and/or selected channel. The resources which are reallocated in response to wireless terminal signals will normally come from a channel implemented using a technology which the wireless terminal has not selected. In this manner additional channel capacity may be dynamically established in response to a wireless terminals selection or need to use a channel implemented using a particular technology. In step 2018 the wireless terminal may also signal to the base station the amount of data it seeks to send on a channel corresponding to a particular technology and/or the period of time it seeks to use a channel corresponding to a particular technology.

Operation proceeds from communication/signal transmission step 2018 to step 2020 in which the wireless terminal switches to the selected channel if it is different from a previously selected channel. If the technology used in the selected communications channel is different form the previously used channel, the wireless terminal changes the processing of received signals and/or one or more physical reception characteristics such as the number of antennas used to receive signals communicated in the channel as may be necessary to receive and process signals in accordance with the technology used to implement the selected channel. Wireless terminal operation while in an on-state occurs on an ongoing basis with operation proceeding form step 2020 to steps 1004 and/or 2008. In this manner, the channels will be periodically evaluated and a different channel corresponding to a different technology may be selected as the wireless terminals conditions and/or rate of movement vary.

Figure 21:
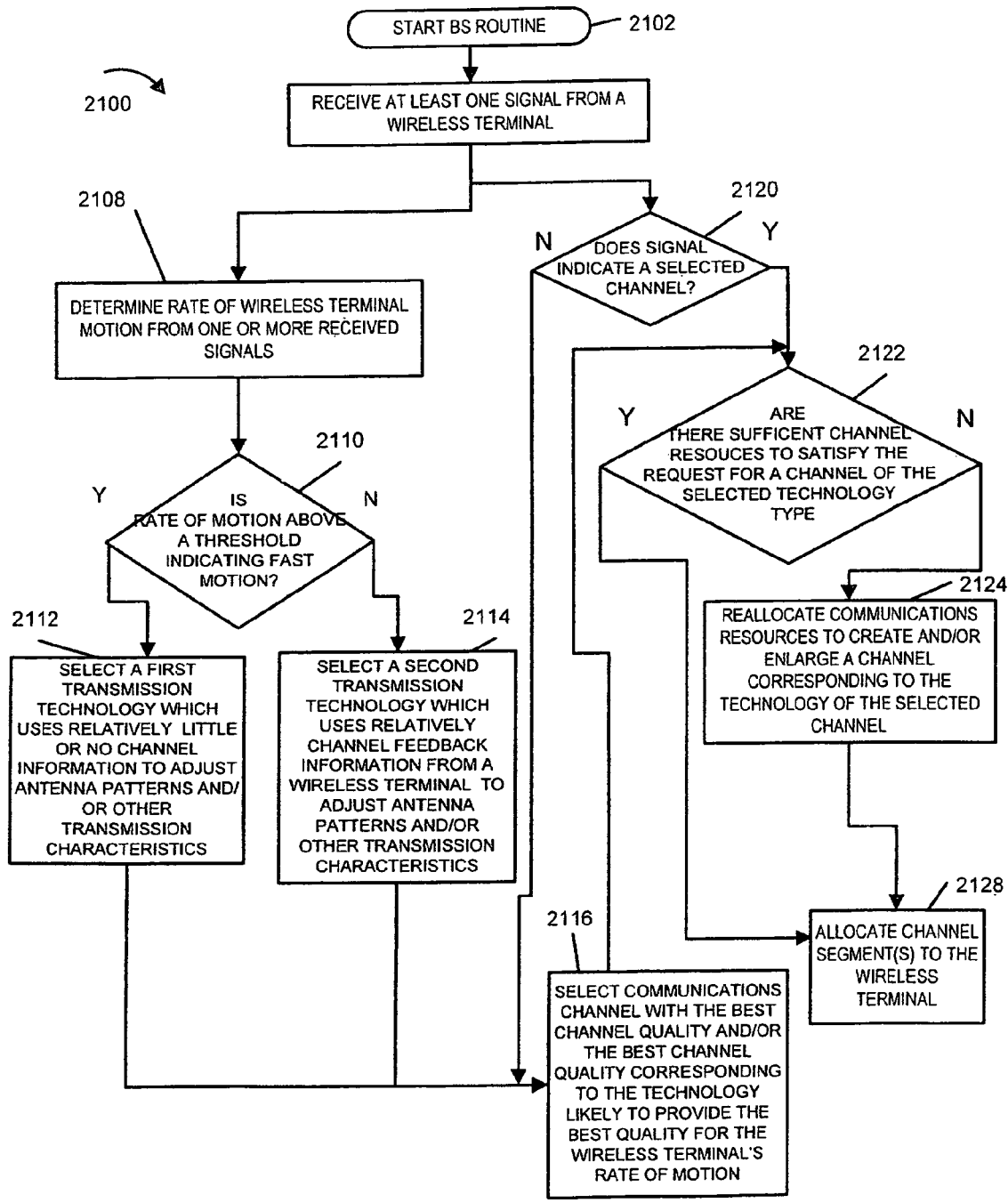
FIG. 21 illustrates a method performed by a base station in accordance with one embodiment of the invention.

FIG. 21 illustrates the steps of a method 2100 preformed by a base station in one exemplary embodiment. The method begins in step 2102. Operation proceeds from step 2102 to step 2103. In step 2103, the base station receives at least one signal from a wireless terminal. The signal may be a channel selection signal indicating a selected wireless terminal channel selection and request for an assignment of segments in the selected channel. It might also be a signal indicating the quality of multiple different channels as measured by the wireless terminal indicating a request for the BS to select a channel for the wireless terminal and assign segment to the wireless terminal from the selected channel. Step 2103 is preformed on an ongoing bases with operation proceeding from step 2103 as signals are received. Once a signal is received form wireless terminal relating to a channel selection and/or assignment request, operation proceeds to steps 2108 and 2120. Step 2108 represents the start of a processing path which is responsible for mobile node motion detection and for selecting a transmission technology suitable for the wireless terminals determined rate of motion. Steps 2108, 2110, 2112, 2114 and channel selection step 2116 are similar to those steps 2008, 2010, 2012, 2014 and channel selection step 2016 previously described with regard to FIG. 20 but they occur in the base station instead of the wireless terminal. Accordingly, these steps will not be described in detail for the sake of brevity.

In step 2120 a determination is made if the received signal indicates a selected channel, e.g., a channel corresponding to a particular transmission technology. If the signal does not indicate a selected channel, a operation proceeds to step 2116 where channel is selected, e.g., based on channel quality information in the received signal. Operation proceeds from 2120 in the case where the signal indicates a selected channel or from step 2116 where the base station selects the channel to step 2122. In step 2122, a determination is made as to whether there are sufficient channel resources, e.g., available segments in the selected channel, to satisfy the request for the selected channel. If there are sufficient channel segments available in a channel implemented with the technology corresponding to the requested channel type, operation proceeds to step 2128. Otherwise operation proceeds from step 2122 to step 2124.

In step 2124 the base station reallocates communications resources to create and/or enlarge a channel corresponding to the technology of the selected channel in order to satisfy the wireless terminals request for a channel implemented with a specific technology. Operation then proceeds to step 2128. In step 2128, the base station allocates segments in a channel implemented using the technology corresponding to the selected channel. Thus, the selected channel may be a channel created, e.g., in response to a wireless terminal's selection of a channel corresponding to a particular technology, or a pre-existing channel.

Processing of signals from wireless terminals and channel segment allocation and reallocations of channel resource occur on an ongoing basis, e.g., while the base station is in operation.

Numerous various on the method of the present invention are possible. Different implementations can be achieved by using different combinations of steps and/or performing different processing or selection operations in a particular step.

A first exemplary communications method which will node be described includes a combination which involves performing the following step:

operating a wireless communications terminal to maintain a set of communications quality information for a plurality of different wireless communications channels which can be used to communicate information between a base station and said wireless communications terminal, said plurality of different wireless communications channels including at least a first communications channel and a second communications channel, the first and second communications channels having different quality characteristics which are a function of first and second transmission technologies used to establish said first and second communications channels, respectively, said first and second transmission technologies being different;

operating the wireless terminal to generate a signal as a function of the maintained communications channel quality information corresponding to at least said first and said second communications channels; and transmitting said signal to said base station.

In the first exemplary embodiment noted above, said signal may provide information on the quality of at least said first and said second communications channel. The first exemplary method may further include the step of operating the base station to select between multiple ones of said plurality of communications channels to use to communicate information to said wireless communications terminal as a function of the channel quality information included in said signal. Said first and second technologies used to implement the first exemplary method may be, and sometimes are, different incompatible access technologies. The different access technologies supported by a base station implementing the method may and sometimes do include CDMA, OFDM, and narrowband signal carrier technologies. In some embodiments each of the different access technologies corresponds to a different technology standard which defines requirements for complying with the particular access technology, said different access technologies being incompatible as indicated by the technology standard corresponding to one of said different access technologies defining communications requirements which violate the defined requirements of the other different access technologies.

In some embodiments of the first exemplary method at least one of the base station and the wireless terminal includes multiple antennas while the method further includes the steps of: making a measurement indicative of a rate of motion of said wireless terminal and operating one of the base station and mobile to select a communications channel for use in communicating to said wireless terminal as a function of the measurement indicative of the rate of motion of said mobile node. Either the wireless terminal or the base station may make the measurement indicative of the rate of motion of the wireless terminal depending on the particular implementation.

In some embodiments of the first method, the step of operating one of the base station and mobile to select a communications channel includes operating said one to perform the steps of: selecting the first communications technology when said measurement indicates a first rate of wireless terminal movement, said first communications technology providing a first amount of frequency diversity to the wireless terminal; and selecting a communications channel corresponding to the second communications technology when said measurement indicates a second rate of wireless terminal movement, the second communications technology using antenna beam forming as a function of feedback information received from the wireless terminal, said second rate of wireless terminal movement being slower than said first rate of wireless terminal movement. In various embodiments of the first exemplary method which involve making a measurement indicative of a rate of motion of said wireless terminal the step of making a measurement may include making a measurement of a Doppler shift in a signal transmitted between said base station and said wireless terminal. The step of making a measurement indicative of a rate of motion of said wireless terminal may alternatively include measuring the rate of change in at least one of: timing control signals which are used to instruct the mobile to make at clock timing change; the rate at which the power in a periodically transmitted signal from the mobile node changes over with time, a rate of change in a measured quality of a communications channel, and a rate of change in a channel fading measurement. In the exemplary method, the step of operating one of the base station and mobile to select a communications channel may and sometimes does include: selecting the first communications channel corresponding to a first technology when said measurement indicates a first rate of wireless terminal movement, said first communications technology using a first amount of channel quality feedback signaling from said wireless terminal to said base station; and selecting a communications channel corresponding to the second communications technology when said measurement indicates a second rate of wireless terminal movement, the second rate of wireless terminal movement being lower than said first rate of wireless terminal movement, the second communications technology using a second amount of channel feedback information, the second amount of channel feedback information being greater than said first amount of channel quality feedback information. In some embodiments, said first communications technology uses two fixed antennas and is a technology which used an Alamouti transmission method, said first communications technology using zero channel quality feedback signaling to said base station to control the antenna pattern used to transmit signals from said base station in particular embodiments. In some embodiments the second transmission method is a beam forming transmission method which involves forming beams as a function of channel quality feedback information received from said wireless terminal.

In some implementations of the first exemplary method both the base station and the wireless terminal include multiple antennas. In one such implementation said second transmission technology is a multiple-input, multiple-output technique.

In accordance with various embodiment of the present invention, the base station includes one or more routines in memory which operate as a channel segment scheduler and a resource allocator. The channel segment schedule assigned channel segments to wireless terminals, e.g., in response to channel selection and/or channel assignment request signals received from one or more wireless terminals. The resource allocator is responsible for allocating resources between channels corresponding to different technologies and may reassign resources from a channel corresponding to one technology to a channel corresponding to another technology, e.g., in response to channel selection signals or channel assignment requests received from one or more wireless terminals.

In some implementations of the first exemplary method the step of operating one of the base station and mobile to select a communications channel includes selecting the first communications technology when said measurement indicates a first rate of wireless terminal movement, said first communications technology providing at least one of a higher frequency diversity and a time diversity than a second communications channel and selecting the second communications channel corresponding to the second communications technology when said measurement indicates a second rate of wireless terminal movement, the second rate of wireless terminal movement being lower than said first rate of wireless terminal movement, the second communications technology providing a high spatial diversity than is available from the first communications channel corresponding to the first communications technology.

In some implementations of the first method, the step of operating one of the base station and mobile to select a communications channel includes operating said one to perform the steps of: selecting a channel in said plurality of channels which provides a higher frequency or time diversity than is available from the non-selected communications channels in said plurality of channels when changes in channel conditions are occurring at a rapid rate; and selecting another channel in said plurality of channels which provides higher spatial diversity than said channel which is selected when changes in channel conditions are occurring at said rapid rate, said another channel being selected when changes in channel conditions are occurring at a slow rate, said slow rate being a rate which is slower than said rapid rate.

One or more of the plurality of channels used in various embodiments by a base station may be fixed, periodic and/or dynamically generated. Various combinations of channels and types of channels, e.g., fixed and dynamically created, are also possible. In some embodiments at least some of said plurality of fixed communications channels are periodic in nature with different combinations of channels existing at different points in time, the combination of channels exiting at any point in time being predictable due to the periodic nature of the communications channels. In some implementations of the exemplary method, the base station periodically reallocates resources between channels corresponding to different technologies based on a predetermined schedule. In various implementations the base station reallocates resources between channels corresponding to different technologies based on signals received from one or more wireless terminals. As part of the method of the invention, the base station may create a channel corresponding to a particular technology in response to a signal indicating a request for a channel using the particular technology from a wireless terminal. The base station sometimes maintains channels created in response to signals from a wireless terminal for a period of time which is a function of at least one signal received from said wireless terminal which requested the channel.

In some implementations of the method of the invention the base station includes multiple antennas, a first set of wireless terminals which interact with said base station in one such embodiment includes multiple receive antennas while a second set of wireless terminals which interact with said base station each include only a single receive antenna. In such an embodiment mobile nodes including multiple receive antennas using a communications channel corresponding to a MIMO technology during some points in time with which they interact with said base station and using channels corresponding to technologies which require only a single receive antenna at different points in time when interacting with said base station. In the case where some wireless terminals include only a single receive antenna, those terminals interact with the base station using one or more channels corresponding to a technology which does not require multiple receive antennas.

In various embodiments of the first exemplary method the base station to reallocates communications resources from one of the plurality of communications channels to a communications channel using a different communications technology as a function of the signal received from said wireless terminal.

In some embodiments where the generated signal transmitted to the base station by the wireless terminal indicates the channel selection to the base station, the method includes operating the wireless terminal to select between the plurality of communications channels based on the maintained set of communications quality information to thereby select the channel corresponding to the transmission technology which provides the better transmission characteristics to said wireless communications terminal. In some implementations of the first exemplary method, the base station operates to alter the use of communications resources to increase the amount of resources used to generate a communications channel using the technology corresponding to a communications channel selected by the wireless terminal.

While described primarily in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless terminal, the method comprising:
maintaining a set of communications quality information for a plurality of different wireless communications channels which can be used to communicate information between a base station and said wireless terminal, at least one of the base station and wireless terminal including multiple antennas, said plurality of different wireless communications channels including at least a first communications channel and a second communications channel, the first and second communications channels having different quality characteristics which are a function of first and second communications technologies used to establish said first and second communications channels, respectively, said first and second communications technologies being different;
determining a rate of motion of said wireless terminal; and
selecting a communications channel for use in communicating with said base station as a function of the determined rate of motion of said wireless terminal.

2. The method of claim 1, further comprising:
transmitting communications channel quality information corresponding to said first and said second communications channels to said base station.

3. The method of claim 1, wherein said first and second communications technologies are different incompatible communications technologies.

4. The method of claim 3, where the different communications technologies include CDMA, OFDM, and narrowband signal carrier technologies.

5. The method of claim 3, where each of the different communications technologies corresponds to a different technology standard which defines requirements for complying with the particular communications technology, said different communications technologies being incompatible as indicated by the technology standard corresponding to one of said different communications technologies defining communications requirements which violate the defined requirements of the other different communications technologies.

6. The method of claim 1, wherein at least one of said first and second communications technologies is an orthogonal frequency division multiplexed communication technology.

7. The method of claim 1, wherein the step of selecting a communications channel includes:
selecting the first communications technology when said determined rate of motion indicates a first rate of wireless terminal movement, said first communications technology providing a first amount of frequency diversity to the wireless terminal; and
selecting a communications channel corresponding to the second communications technology when said determined rate of motion indicates a second rate of wireless terminal movement, the second communications technology using antenna beam forming as a function of feedback information received from the wireless terminal, said second rate of wireless terminal movement being slower than said first rate of wireless terminal movement.

8. The method of claim 1, wherein determining a rate of motion includes making a measurement indicative of a rate of motion of said wireless terminal by measuring a Doppler shift in a signal transmitted between said base station and said wireless terminal.

9. The method of claim 1, wherein said step of determining a rate of motion of said wireless terminal includes measuring at least one of:
a rate of change in timing control signals which are used to instruct the wireless terminal to make a clock timing change;
a rate at which power in a periodically transmitted signal from the wireless terminal changes over time;
a rate of change in a measured quality of a communications channel; and
a rate of change in a channel fading measurement.

10. The method of claim 1, wherein the step of selecting a communications channel includes:
selecting the first communications technology when said determined rate of motion indicates a first rate of wireless terminal movement, said first communications technology using a first amount of channel quality feedback signaling from said wireless terminal to said base station; and
selecting a communications channel corresponding to the second communications technology when said determined rate of motion indicates a second rate of wireless terminal movement, the second rate of wireless terminal movement being lower than said first rate of wireless terminal movement, the second communications technology using a second amount of channel feedback, the second amount of channel feedback being greater than said first amount of channel quality feedback.

11. The method of claim 10, wherein said first communications technology uses two fixed antennas and is a technology which used an Alamouti transmission method, said first communications technology using zero channel quality feedback signaling to said base station to control the antenna pattern used to transmit signals from said base station.

12. The method of claim 10, wherein said second communications technology uses a beam forming transmission method which involves forming beams as a function of channel quality feedback received from said wireless terminal.

13. The method of claim 10, wherein both the base station and the wireless terminal include multiple antennas, said second communications technology using a multiple-input, multiple-output technique.

14. The method of claim 1, wherein the step of selecting a communications channel includes:
selecting the first communications technology when said determined rate of motion indicates a first rate of wireless terminal movement, said first communications technology providing at least one of a higher frequency diversity and a time diversity than a second communications channel; and
selecting the second communications channel corresponding to the second communications technology when said determined rate of motion indicates a second rate of wireless terminal movement, the second rate of wireless terminal movement being lower than said first rate of wireless terminal movement, the second communications technology providing a high spatial diversity than is available from the first communications channel corresponding to the first communications technology.

15. The method of claim 1, wherein the step of selecting a communications channel includes:
selecting a communications channel in said plurality of communications channels which provides a higher frequency or time diversity than is available from the non-selected communications channels in said plurality of channels when changes in channel conditions are occurring at a rapid rate; and
selecting another communications channel in said plurality of communications channels which provides higher spatial diversity than said communications channel which is selected when changes in communications channel conditions are occurring at said rapid rate, said another communications channel being selected when changes in channel conditions are occurring at a slow rate, said slow rate being a rate which is slower than said rapid rate.

16. The method of claim 1, wherein said plurality of communications channels are fixed.

17. The method of claim 16, wherein at least some of said plurality of fixed communications channels are periodic in nature with different combinations of communications channels existing at different points in time, the combination of communications channels exiting at any point in time being predictable due to the periodic nature of the communications channels.

18. A wireless terminal comprising a processor configured to control said wireless terminal to implement a method, the method comprising:
maintaining a set of communications quality information for a plurality of different wireless communications channels which can be used to communicate information between a base station and said wireless terminal, at least one of the base station and wireless terminal including multiple antennas, said plurality of different wireless communications channels including at least a first communications channel and a second communications channel, the first and second communications channels having different quality characteristics which are a function of first and second communications technologies used to establish said first and second communications channels, respectively, said first and second communications technologies being different;

determining a rate of motion of said wireless terminal; and selecting a communications channel for use in communicating to said base station as a function of the determined rate of motion of said wireless terminal.

19. The wireless terminal of claim 18, wherein the method further comprises:

transmitting communications channel quality information corresponding to said first and said second communications channels to said base station.

20. The wireless terminal of claim 18, wherein said first and second communications technologies are different incompatible communications technologies.

21. A non-transitory computer readable medium embodying machine executable instruction for controlling a wireless terminal to implement a method, the method comprising:

maintaining a set of communications quality information for a plurality of different wireless communications channels which can be used to communicate information between a base station and said wireless terminal, at least one of the base station and wireless terminal including multiple antennas, said plurality of different wireless communications channels including at least a first communications channel and a second communications channel, the first and second communications channels having different quality characteristics which are a function of first and second communications technologies used to establish said first and second communications channels, respectively, said first and second communications technologies being different;

determining a rate of motion of said wireless terminal; and selecting a communications channel for use in communicating to said base station as a function of the determined rate of motion of said wireless terminal.

22. The non-transitory computer readable medium of claim 21, wherein the method further comprises:

transmitting communications channel quality information corresponding to said first and said second communications channels to said base station.

23. The non-transitory computer readable medium of claim 21, wherein said first and second communications technologies are different incompatible communications technologies.

24. A wireless terminal comprising:

means for storing a set of communications quality information for a plurality of different wireless communications channels which can be used to communicate information between a base station and said wireless terminal, at least one of the base station and wireless terminal including multiple antennas, said plurality of different wireless communications channels including at least a first communications channel and a second communications channel, the first and second communications channels having different quality characteristics which are a function of first and second communications technologies used to establish said first and second communications channels, respectively, said first and second communications technologies being different;

means for determining a rate of motion of said wireless terminal; and means for selecting a communications channel for use in communicating to said base station as a function of the determined rate of motion of said wireless terminal.

25. The wireless terminal of claim 24, further comprising:

means for transmitting communications channel quality information corresponding to said first and said second communications channels to said base station.

26. The wireless terminal of claim 24, wherein said first and second communications technologies are different incompatible communications technologies.

27. A wireless terminal comprising:

a memory including a set of communications quality information for a plurality of different wireless communications channels which can be used to communicate information between a base station and said wireless terminal, at least one of the base station and wireless terminal including multiple antennas, said plurality of different wireless communications channels including at least a first communications channel and a second communications channel, the first and second communications channels having different quality characteristics which are a function of first and second communications technologies used to establish said first and second communications channels, respectively, said first and second communications technologies being different;

a processor configured to determine a rate of motion of said wireless terminal; and a selection module configured to select a communications channel for use in communicating to said base station as a function of the determined rate of motion of said wireless terminal.

28. The wireless terminal of claim 27, further comprising:

a transmitter configured to transmit communications channel quality information corresponding to said first and said second communications channels to said base station.

29. The wireless terminal of claim 27, wherein said first and second communications technologies are different incompatible communications technologies.

* * * * *